United States Patent
Nishimura et al.

(10) Patent No.: US 10,479,365 B2
(45) Date of Patent: Nov. 19, 2019

(54) AUTOMOBILE AND CONTROL METHOD FOR AUTOMOBILE

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Yukimasa Nishimura, Miyoshi (JP); Yoshizo Akita, Anjo (JP); Tadaaki Watanabe, Anjo (JP)

(73) Assignees: Toyota Jidosha Kabushiki Kaisha, Toyota-shi, Aichi-ken (JP); Aisin AW Co., Ltd., Anjo-shi, Aichi-ken, (JP)

( * ) Notice: Subject to any disclaimer, the term of this patent is extended or adjusted under 35 U.S.C. 154(b) by 0 days.

(21) Appl. No.: 15/872,348

(22) Filed: Jan. 16, 2018

(65) Prior Publication Data
US 2018/0201267 A1 Jul. 19, 2018

(30) Foreign Application Priority Data
Jan. 17, 2017 (JP) ................. 2017-006244

(51) Int. Cl.
*B60W 30/188* (2012.01)
*B60W 10/08* (2006.01)
(Continued)

(52) U.S. Cl.
CPC ............ *B60W 30/188* (2013.01); *B60K 6/30* (2013.01); *B60K 6/365* (2013.01); *B60K 6/445* (2013.01); *B60K 6/547* (2013.01); *B60W 10/06* (2013.01); *B60W 10/08* (2013.01); *B60W 10/115* (2013.01); *B60W 10/30* (2013.01); *B60W 20/19* (2016.01); *B60W 20/30* (2013.01); *B60W 20/50* (2013.01); *B60W 50/038* (2013.01); *B60W 2510/1025* (2013.01); *B60W 2510/18* (2013.01); *B60W 2520/10* (2013.01); *B60W 2540/10* (2013.01); *B60W 2540/103* (2013.01);
(Continued)

(58) Field of Classification Search
CPC .. B60W 30/188; B60W 10/08; B60W 10/115; B60W 20/30; B60W 20/50; B60W 2510/1025; B60W 2510/18; B60W 2540/10; B60W 2540/12; B60W 2710/10; B60W 2710/083
See application file for complete search history.

(56) References Cited

U.S. PATENT DOCUMENTS

| | | | | |
|---|---|---|---|---|
| 2005/0256623 A1* | 11/2005 | Hubbard | ................ | B60L 15/00 701/54 |
| 2008/0300099 A1* | 12/2008 | Yamamoto | ............. | B60K 6/365 477/3 |
| 2013/0345020 A1* | 12/2013 | Ikuro | .................... | B60K 6/485 477/39 |

FOREIGN PATENT DOCUMENTS

| | | |
|---|---|---|
| JP | 2006-46487 | 2/2006 |
| JP | 2007-203796 | 8/2007 |

* cited by examiner

*Primary Examiner* — Huan Le
(74) *Attorney, Agent, or Firm* — Finnegan, Henderson, Farabow, Garrett & Dunner, LLP

(57) ABSTRACT

An electronic control unit controls a motor so that a torque applied to an input shaft does not exceed an upper limit torque. The electronic control unit sets so as to restrict the upper limit torque from a first torque to a second torque smaller than the first torque, and then return the upper limit torque to the first torque more gradually when a first condition that a driver is assumed to have felt a decrease in driving force output to driving wheels is met before the upper limit torque is returned than when the first condition is not met.

12 Claims, 15 Drawing Sheets

(51) Int. Cl.
   *B60W 10/115* (2012.01)
   *B60W 20/30* (2016.01)
   *B60W 20/50* (2016.01)
   *B60K 6/30* (2007.10)
   *B60K 6/445* (2007.10)
   *B60W 10/30* (2006.01)
   *B60K 6/365* (2007.10)
   *B60W 50/038* (2012.01)
   *B60K 6/547* (2007.10)
   *B60W 10/06* (2006.01)
   *B60W 20/19* (2016.01)

(52) U.S. Cl.
   CPC ..... *B60W 2540/12* (2013.01); *B60W 2540/14* (2013.01); *B60W 2710/0666* (2013.01); *B60W 2710/083* (2013.01); *B60W 2710/10* (2013.01); *B60W 2710/1022* (2013.01); *B60W 2710/1077* (2013.01); *B60W 2710/1094* (2013.01); *B60Y 2200/92* (2013.01); *F16H 2200/2007* (2013.01); *F16H 2200/2041* (2013.01); *F16H 2200/2066* (2013.01); *Y02T 10/6239* (2013.01); *Y02T 10/7275* (2013.01); *Y10S 903/93* (2013.01); *Y10S 903/945* (2013.01)

FIG. 4

|  | C1 | C2 | B1 | B2 | SC1 | SC2 |
|---|---|---|---|---|---|---|
| 1st | O | – | – | O | ON | OFF |
| 2nd | O | – | O | – | ON | OFF |
| 3rd | O | O | – | – | ON | OFF |
| 4th | – | O | O | – | ON | OFF |
| R. | O | – | – | O | ON | ON |
| F/S 1st | O | – | – | O | OFF | ON |
| F/S 3rd | O | O | – | – | OFF | OFF |

※ "O": ENGAGED, "–": DISENGAGED

AUTOMOBILE AND CONTROL METHOD FOR AUTOMOBILE

INCORPORATION BY REFERENCE

The disclosure of Japanese Patent Application No. 2017-006244 filed on Jan. 17, 2017 including the specification, drawings and abstract is incorporated herein by reference in its entirety.

BACKGROUND

1. Technical Field

The present disclosure relates to an automobile and a control method for an automobile.

2. Description of Related Art

An automobile including a motor and a transmission that has an input shaft connected to the motor and an output shaft coupled to driving wheels and transmits power while changing gears between the input shaft and the output shaft has been proposed (e.g., see Japanese Patent Application Publication No. 2006-46487).

SUMMARY

In such an automobile, for some reason an upper limit torque for the input shaft of the transmission is sometimes restricted from a first torque to a second torque smaller than the first torque and then returned to the first torque. If a driver feels a decrease in a torque output to the driving wheels while the upper limit torque is restricted to the second torque, the driver may press harder on the accelerator pedal. If in this state the upper limit torque is returned from the second torque to the first torque in a comparatively short time (quickly), the driver may feel a sudden acceleration.

A main object of an automobile and a control method for an automobile of the present disclosure is to further suppress a sudden acceleration the driver may feel when the upper limit torque for the input shaft of the transmission is restricted from a first torque to a second torque smaller than the first torque and then returned to the first torque.

To achieve the above main object, the automobile and the control method for an automobile of the present disclosure have adopted the following solutions.

A first aspect of the present disclosure is an automobile. The automobile includes: a motor; a transmission includes an input shaft connected to the motor and an output shaft coupled to driving wheels; and an electronic control unit is configured to control the motor and the transmission. The transmission is configured to transmit power while changing shift gears between the input shaft and the output shaft. The electronic control unit is configured to controls the motor such that a torque applied to the input shaft does not exceed an upper limit torque. The electronic control unit is configured to set so as to restrict the upper limit torque from a first torque to a second torque smaller than the first torque. The electronic control unit is configured to set so as to return the upper limit torque from the second torque to the first torque more gradually when a first condition is met before the upper limit torque is returned to the first torque than when the first condition is not met. The first condition is a condition that a driver is assumed to have felt a decrease in driving force output to the driving wheels.

With this configuration, the motor is controlled such that the torque applied to the input shaft does not exceed the upper limit torque. Moreover, the electronic control unit is configured to set so as to restrict the upper limit torque from the first torque to the second torque smaller than the first torque, and then return the upper limit torque to the first torque more gradually when the first condition that the driver is assumed to have felt a decrease in driving force output to the driving wheels is met before the upper limit torque is returned than when the first condition is not met. Thus, it is possible to suppress a sudden acceleration the driver may feel.

The automobile may further include a hydraulic control device that supplies hydraulic pressure to a plurality of engaging elements of the transmission. The electronic control unit may be configured to control the transmission so as to shift into fail-safe shift gear when abnormality has occurred in the hydraulic control device. The electronic control unit may be configured to restrict the upper limit torque to the second torque when the electronic control unit controls the transmission so as to shift into the fail-safe gear. Moreover, the electronic control unit may be configured to return the upper limit torque to the first torque when the transmission has shifted into the fail-safe shift gear while the upper limit torque is the second torque. With this configuration, it is possible to suppress a sudden acceleration the driver may feel when the upper limit torque is returned to the first torque, while the first condition is met, upon the transmission shifting into the fail-safe shift gear.

In the above automobile, the first condition may be a condition that the automobile has an experience where a brake is released while the upper limit torque is the second torque. The first condition may also be a condition that the automobile has an experience where either a duration time or a cumulative time for which a brake is released reaches a predetermined time while the upper limit torque is the second torque. The first condition may also be a condition that the automobile has an experience where an accelerator operation amount is larger than a threshold value while the upper limit torque is the second torque. The first condition may also be a condition that the automobile has an experience where either a duration time or a cumulative time for which an accelerator operation amount is larger than a threshold value reaches a predetermined time while the upper limit torque is the second torque. With these configurations, the first condition is more appropriate.

In the above automobile, the electronic control unit may be configured to control the motor so as to hold the upper limit torque when following conditions i) and ii) are both satisfied, i) the first condition is met before the upper limit torque is returned to the first torque, and ii) a temporary required torque for the input shaft based on an accelerator operation amount is not larger than the upper limit torque; and the electronic control unit may be configured to control the motor so as to increase the upper limit torque when following conditions i) and iii) are both satisfied, i) the first condition is met before the upper limit torque is returned to the first torque and, iii) the temporary required torque is larger than the upper limit torque. With this configuration, it is possible to increase the upper limit torque according to a relation between the magnitudes of the upper limit torque and the temporary required torque.

In the above automobile, the electronic control unit may be configured to control the transmission so as to shift into fail-safe shift gear when abnormality has occurred in the transmission. The electronic control unit may be configured to restrict the upper limit torque to the second torque when the electronic control controls the transmission so as to shift into the fail-safe shift gear.

In the above automobile, the electronic control unit may be configured to set so as to return the upper limit torque to the first torque by increasing the upper limit torque from the second torque by a predetermined torque at a time when a first condition that a driver is assumed to have felt a decrease in driving force output to the driving wheels is met before the upper limit torque is returned from the second torque to the first torque. The electronic control unit may be configured to set so as to return the upper limit torque to the first torque by increasing the upper limit torque from the second torque by a torque larger than the predetermined torque at a time when the first condition is not met before the upper limit torque is returned from the second torque to the first torque.

A second aspect of the present disclosure is a control method for an automobile. The automobile includes: a motor; a transmission includes an input shaft connected to the motor and an output shaft coupled to driving wheels; an electronic control unit is configured to control the motor and the transmission. The transmission is configured to transmit power while changing shift gears between the input shaft and the output shaft. The electronic control unit is configured to control the motor such that a torque applied to the input shaft does not exceed an upper limit torque. The control method includes: setting, by the electronic control unit, so as to restrict the upper limit torque from a first torque to a second torque smaller than the first torque; and setting, by the electronic control unit, so as to return the upper limit torque from the second torque to the first torque more gradually when a first condition is met before the upper limit torque is returned to the first torque than when the first condition is not met. The first condition being a condition that a driver is assumed to have felt a decrease in driving force output to the driving wheels.

With this configuration, the motor is controlled so that the torque applied to the input shaft does not exceed the upper limit torque. Moreover, the electronic control unit is configured to set so as to restrict the upper limit torque from the first torque to the second torque smaller than the first torque, and then return the upper limit torque to the first torque more gradually when the first condition that the driver is assumed to have felt a decrease in driving force output to the driving wheels is met before the upper limit torque is returned than when the first condition is not met. Thus, it is possible to suppress a sudden acceleration the driver may feel.

In the above the control method for the automobile, the control method may include: setting, by the electronic control unit, so as to return the upper limit torque to the first torque by increasing the upper limit torque from the second torque by a predetermined torque at a time when the first condition is met before the upper limit torque is returned from the second torque to the first torque; and setting, by the electronic control unit, so as to return the upper limit torque to the first torque by increasing the upper limit torque from the second torque by a torque larger than the predetermined torque at a time when the first condition is not met before the upper limit torque is returned from the second torque to the first torque.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is an actuation table showing relations between each gear of the transmission 60 and actuation states of clutches C1, C2, brakes B1, B2, and on-off valves SC1, SC2;

DETAILED DESCRIPTION OF EMBODIMENTS

Next, a form of implementation of the present disclosure will be described using an embodiment.

Figure 1:
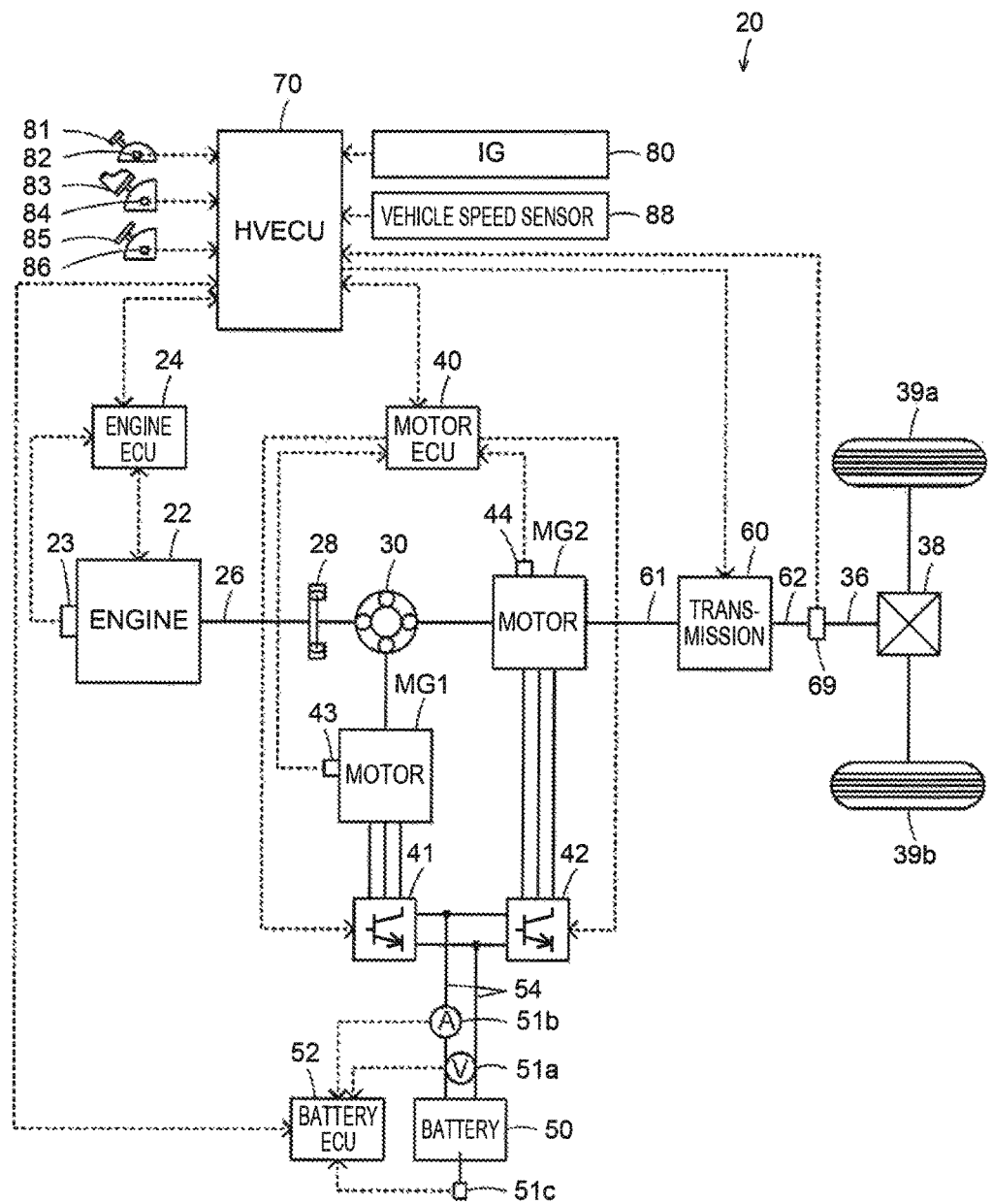
FIG. 1 is a configuration diagram showing an overview of the configuration of a hybrid automobile 20 as an embodiment of the present disclosure.
Figure 2:
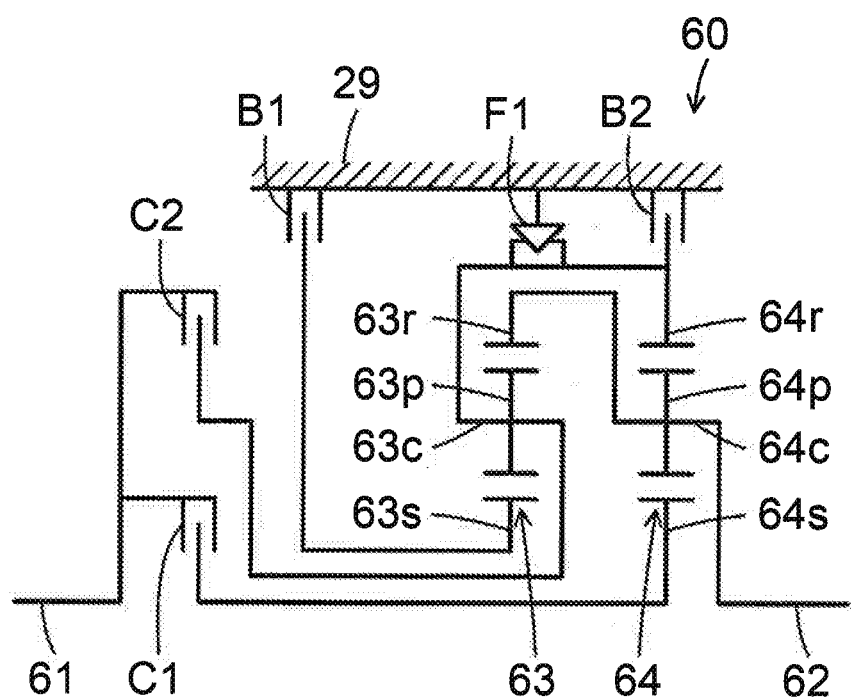
FIG. 2 is a configuration diagram showing an overview of the configuration of a transmission 60.
Figure 3:
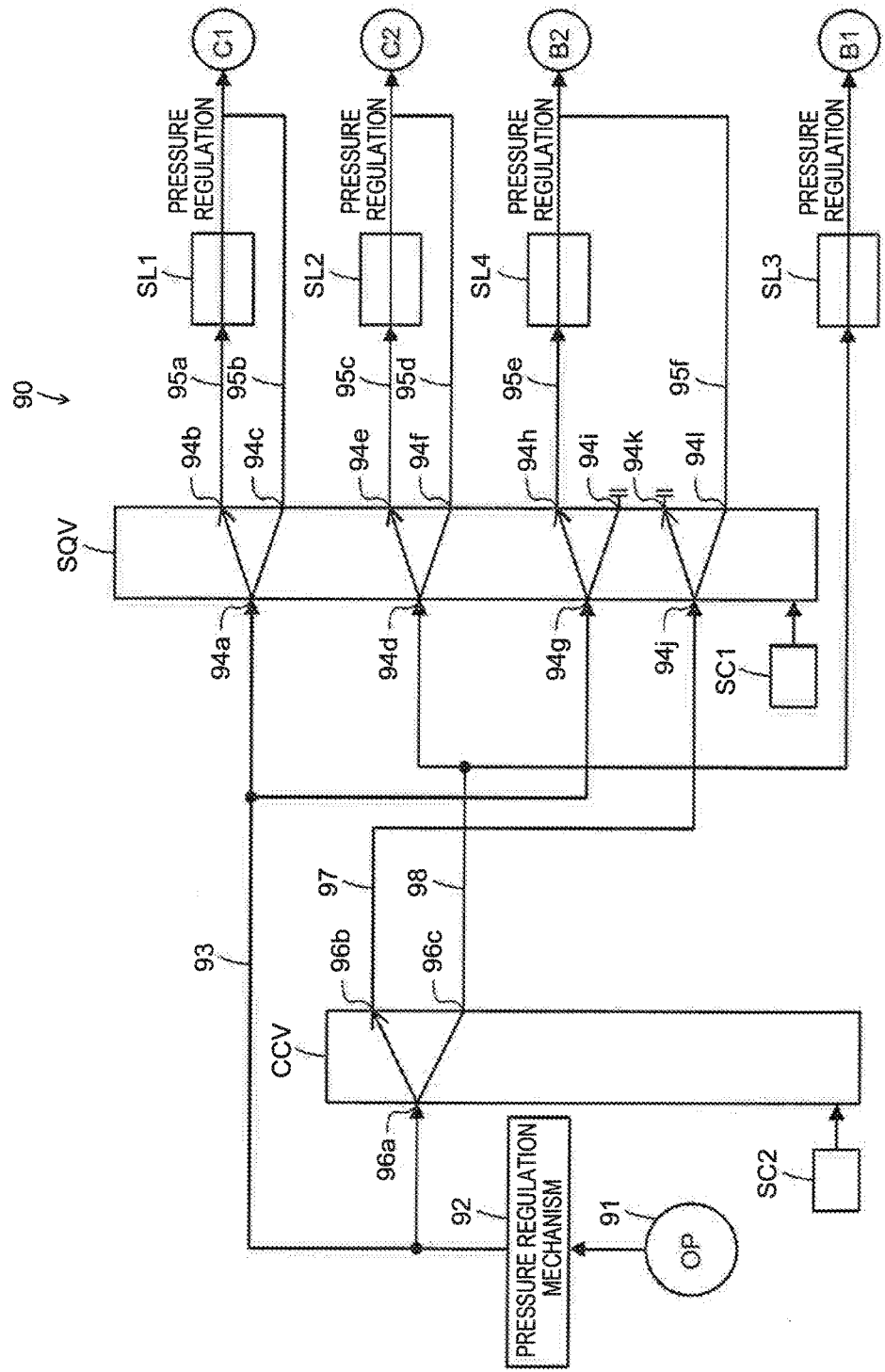
FIG. 3 is a configuration diagram showing an overview of the configuration of a hydraulic control device 90.

FIG. 1 is a configuration diagram showing an overview of the configuration of a hybrid automobile 20 as the embodiment of the present disclosure. FIG. 2 is a configuration diagram showing an overview of the configuration of a transmission 60. FIG. 3 is a configuration diagram showing an overview of the configuration of a hydraulic control device 90. As shown in FIG. 1, the hybrid automobile 20 of the embodiment includes an engine 22, a planetary gear 30, motors MG1, MG2, inverters 41, 42, a battery 50 as an electric storage device, and a hybrid electronic control unit (hereinafter referred to as an HVECU) 70.

The engine 22 is configured as an internal combustion engine that outputs power by using gasoline, light oil, etc. as fuel. The operation of the engine 22 is controlled by an engine electronic control unit (hereinafter referred to as an engine ECU) 24.

Although this is not shown, the engine ECU 24 is configured as a microprocessor having a CPU as a main component, and includes, other than the CPU, an ROM that stores a processing program, an RAM that temporarily stores data, input and output ports, and a communication port Signals from various sensors required to control the operation of the engine 22, for example, a crank angle θcr from a crank position sensor 23 that detects a rotation position of a crankshaft 26 of the engine 22, are input through the input port into the engine ECU 24. Various control signals for controlling the operation of the engine 22 are output from the engine ECU 24 through the output port. The engine ECU 24 is connected to the HVECU 70 through the communication port. The engine ECU 24 calculates a speed Ne of the engine 22 on the basis of the crank angle θcr from the crank position sensor 23.

The planetary gear 30 is configured as a single-pinion planetary gear mechanism. A rotor of the motor MG1 is connected to a sun gear of the planetary gear 30. An input shaft 61 of the transmission 60 is connected to a ring gear of the planetary gear 30. The crankshaft 26 of the engine 22 is connected to a carrier of the planetary gear 30 through a damper 28.

The motor MG1 is configured as a synchronous generator-motor, for example, and has the rotor connected to the sun gear of the planetary gear 30 as described above. The motor MG2 is configured as a synchronous generator-motor, for example, and has a rotor connected to the input shaft 61 of the transmission 60. The inverters 41, 42 are used to drive the motors MG1, MG2, and are connected to the battery 50 through power lines 54. The motors MG1, MG2 are driven to rotate as switching of a plurality of switching elements (not shown) of the inverters 41, 42 is controlled by a motor electronic control unit (hereinafter referred to as a motor ECU) 40.

Although this is not shown, the motor ECU 40 is configured as a microprocessor having a CPU as a main component, and includes, other than the CPU, an ROM that stores a processing program, an RAM that temporarily stores data, input and output ports, and a communication port. Signals from various sensors required to control the driving of the motors MG1, MG2, for example, rotation positions θm1, θm2 of the rotors of the motors MG1, MG2 from rotation position detection sensors 43, 44 that detect rotation positions of the rotors of the motors MG1, MG2, are input through the input port into the motor ECU 40. For example, switching control signals for the plurality of switching elements (not shown) of the inverters 41, 42 are output from the motor ECU 40 through the output port. The motor ECU 40 is connected to the HVECU 70 through the communication port. The motor ECU 40 calculates rotation speeds Nm1, Nm2 of the motors MG1, MG2 on the basis of the rotation positions θm1, θm2 of the rotors of the motors MG1, MG2 from the rotation position detection sensors 43, 44.

The transmission 60 is configured as a four-speed transmission, and includes, as shown in FIG. 1 and FIG. 2: the input shaft 61 connected to the ring gear of the planetary gear 30 and the rotor (rotating shaft) of the motor MG2; an output shaft 62 connected to a driving shaft 36 that is coupled to driving wheels 39a, 39b through a differential gear 38; two single-pinion planetary gears 63, 64; two clutches C1, C2 and two brakes B1, B2 as a plurality of engaging elements for hydraulic driving; and a one-way clutch F1.

The planetary gear 63 has a sun gear 63s that is an external gear, a ring gear 63r that is an internal gear disposed concentrically with the sun gear 63s, a plurality of pinion gears 63p that respectively mesh with the sun gear 63s and the ring gear 63r, and a carrier 63c that holds the plurality of pinion gears 63p so as to be able to rotate and revolve.

The planetary gear 64 has a sun gear 64s that is an external gear, a ring gear 64r that is an internal gear disposed concentrically with the sun gear 64s, a plurality of pinion gears 64p that respectively mesh with the sun gear 64s and the ring gear 64r, and a carrier 64c that holds the plurality of pinion gears 64p so as to be able to rotate and revolve.

The carrier 63c of the planetary gear 63 and the ring gear 64r of the planetary gear 64 are coupled (fixed) to each other, and the ring gear 63r of the planetary gear 63 and the carrier 64c of the planetary gear 64 are coupled to each other. Thus, the planetary gear 63 and the planetary gear 64 function as a so-called four-element mechanism of which the four rotating elements are the sun gear 63s of the planetary gear 63, the carrier 63c of the planetary gear 63 and the ring gear 64r of the planetary gear 64, the ring gear 63r of the planetary gear 63 and the carrier 64c of the planetary gear 64, and the sun gear 64s of the planetary gear 64. The ring gear 63r of the planetary gear 63 and the carrier 64c of the planetary gear 64 are coupled to the output shaft 62 (driving shaft 36).

The clutch C1 connects and disconnects the input shaft 61 and the sun gear 64s of the planetary gear 64 to and from each other. The clutch C2 connects and disconnects the input shaft 61 on one side and the carrier 63c of the planetary gear 63 and the ring gear 64r of the planetary gear 64 on the other side to and from each other. The brake B1 fixes (connects) the sun gear 63s of the planetary gear 63 to a transmission case 29 as a stationary member so as not to be rotatable relative to the transmission case 29, and releases the sun gear 63s so as to be rotatable relative to the transmission case 29. The brake B2 fixes (connects) the carrier 63c of the planetary gear 63 and the ring gear 64r of the planetary gear 64 to the transmission case 29 so as not to be rotatable relative to the transmission case 29, and releases the carrier 63c and the ring gear 64r so as to be rotatable relative to the transmission case 29. The one-way clutch F1 allows rotation of one of the carrier 63c of the planetary gear 63 and the ring gear 64r of the planetary gear 64 while restraining rotation of the other one.

The clutches C1, C2 and the brakes B1, B2 operate as a working fluid is supplied and discharged by the hydraulic control device 90. The hydraulic control device 90 includes a valve body (not shown), an electric pump 91, a pressure regulation mechanism (e.g., primary regulator valve) 92, linear solenoid valves SL1 to SL4, a sequence valve SQV, and a clutch control valve CCV.

The electric pump 91 is driven by a motor (not shown) to pump the working fluid. The pressure regulation mechanism 92 regulates the pressure of the working fluid from the electric pump 91 and outputs the working fluid as a source pressure. The linear solenoid valve SL1 is configured as a normally closed linear solenoid valve, and when the source pressure is acting on an oil path 95a, regulates the source pressure and supplies this pressure to the clutch C1. The linear solenoid valve SL2 is configured as a normally closed linear solenoid valve, and when the source pressure is acting on an oil path 95c, regulates the source pressure and supplies this pressure to the clutch C2. The linear solenoid valve SL3 is configured as a normally closed linear solenoid valve, and when the source pressure is acting on an oil path 98, regulates the source pressure and supplies this pressure to the brake B1. The linear solenoid valve SL4 is configured as a normally closed linear solenoid valve, and when the source pressure is acting on an oil path 95e, regulates the source pressure and supplies this pressure to the brake B2

The sequence valve SQV is configured as a spool valve having a sleeve that has ports 94a to 94l formed therein, a spool that slides inside the sleeve, and a spring that urges the spool. The port 94a communicates with an oil path 93 leading from the pressure regulation mechanism 92. The port 94b communicates with the linear solenoid valve SL1 through the oil path 95a. The port 94c communicates with the clutch C1 through an oil path 95b that bypasses the linear solenoid valve SL1. The port 94d communicates with a port 96c of the clutch control valve CCV through the oil path 98. The port 94e communicates with the linear solenoid valve SL2 through the oil path 95c. The port 94f communicates with the clutch C2 through an oil path 95d that bypasses the linear solenoid valve SL2. The port 94h communicates with the linear solenoid valve SL4 through an oil path 95e. The port 94i is closed. The port 94j communicates with a port 96b through an oil path 97. The port 94k is closed. The port 94l communicates with the brake B2 through an oil path 95f that bypasses the linear solenoid valve SL4. The spool of the sequence valve SQV moves according to turning on and off of an on-off solenoid SC1. When the on-off solenoid SC1 is on, the sequence valve SQV provides communication between the ports 94a, 94b, between the ports 94d, 94e, between the ports 94g, 94h, and between the ports 94j, 94k. When the on-off solenoid SC1 is off, the sequence valve SQV provides communication between the ports 94a, 94c, between the ports 94d, 94f, between the ports 94g, 94i, and between the ports 94j, 94l.

The clutch control valve CCV is configured as a spool valve having a sleeve that has ports 96a to 96c formed therein, a spool that slides inside the sleeve, and a spring that urges the spool. The port 96a communicates with the oil path 93 leading from the pressure regulation mechanism 92. The port 96b communicates with the port 94j of the sequence valve SQV through the oil path 97. The port 96c communicates with the port 94d of the sequence vale SQV through the oil path 98, and communicates with the linear solenoid valve SL3 through the oil path 98. The spool of the clutch control valve CCV moves according to turning on and off of an on-off solenoid SC2. When the on-off solenoid SC2 is on, the clutch control valve CCV provides communication between the ports 96a, 96b. When the on-off solenoid SC2 is off, the clutch control valve CCV provides communication between the ports 96a, 96c.

Figure 5:
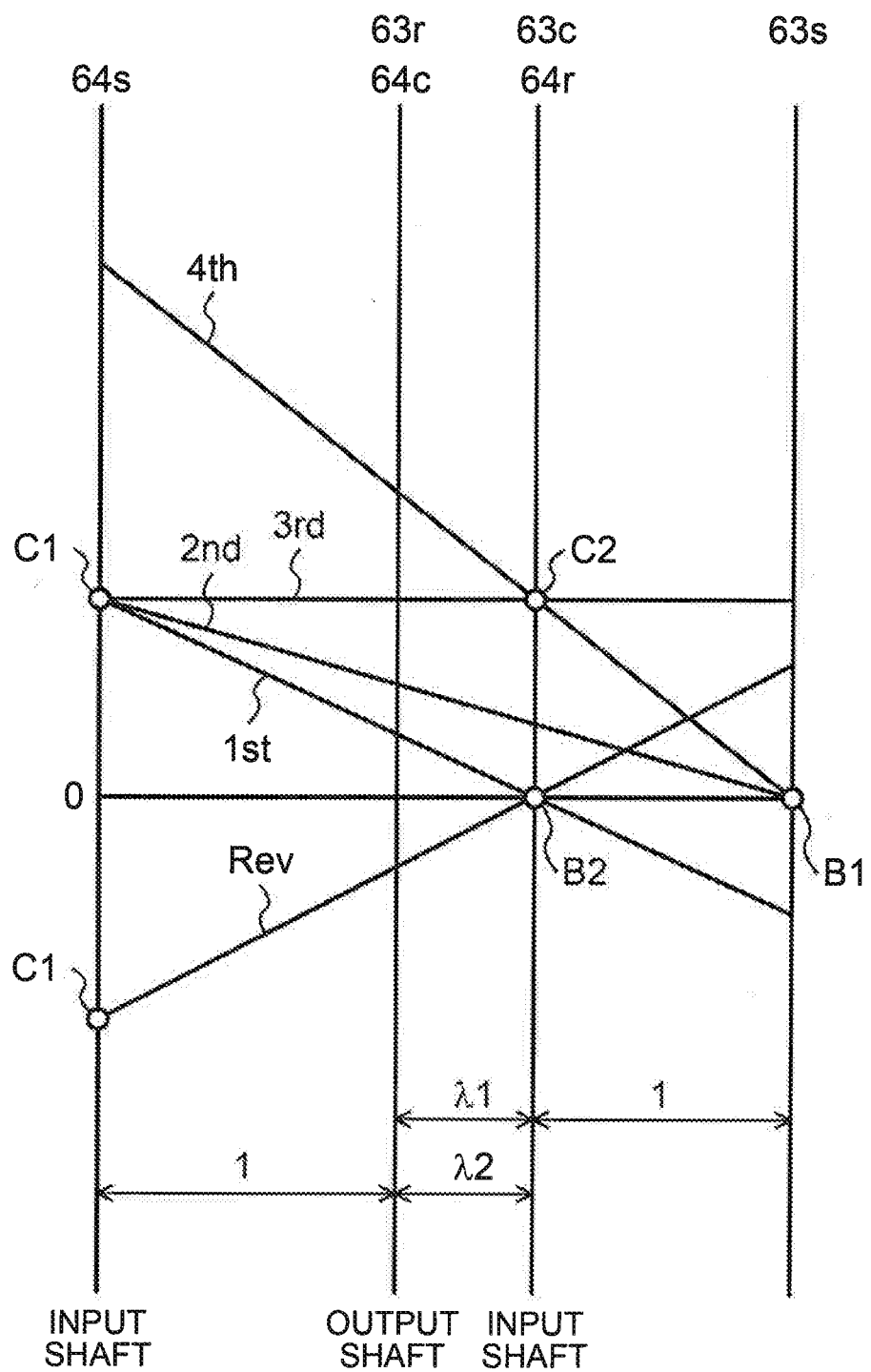
FIG. 5 is a view illustrating an example of a collinear chart showing relations among rotation speeds of rotating elements of the transmission 60.

FIG. 4 is an actuation table showing relations between each gear of the transmission 60 and actuation states of the clutches C1, C2, the brakes B1, B2, and the on-off valves SC1, SC2. FIG. 5 is a view illustrating an example of a collinear chart showing relations among rotation speeds of the rotating elements of the transmission 60.

When the transmission 60 is normal and a shift position SP is a forward position, transition to each of forward gears from first gear to fourth gear of the transmission 60 is effected as follows: The on-off solenoid SC1 is turned on, and the on-off solenoid SC2 is turned off. As a result, the source pressure from the pressure regulation mechanism 92 acts on the oil paths 93, 95a, 95e and the oil paths 98, 95c. Then, hydraulic pressure on the clutches C1, C2 and the brakes B1, B2 is adjusted by the linear solenoid valves SL1 to SL4. Transition to first gear is effected by engaging the clutch C1 and the brake B2 and disengaging the clutch C2 and the brake B. Transition to second gear is effected by engaging the clutch C1 and the brake B1 and disengaging the clutch C2 and the brake B2. Transition to third gear is effected by engaging the clutches C1, C2 and disengaging the brakes B1, B2. Transition to fourth gear is effected by engaging the clutch C2 and the brake B1 and disengaging the clutch C1 and the brake B2.

When the transmission 60 is normal and the shift position SP is a reverse position, transition to reverse gear is effected as follows: Both the on-off solenoids SC1, SC2 are turned on. As a result, the source pressure from the pressure regulation mechanism 92 acts on the oil paths 93, 95a, 95e but does not act on the oil paths 98, 95c. Then, hydraulic pressure on the clutch C1 and the brake B2 is adjusted by the linear solenoid valves SL1, SL4. Thus, transition to reverse gear is effected by engaging the clutch C1 and the brake B2 and disengaging the clutch C2 and the brake B1.

When the transmission 60 is normal and the shift position SP is a parking position or a neutral position, all the clutches C1, C2 and the bakes B1, B2 are disengaged to disconnect the input shaft 61 and the output shaft 62 from each other (interrupt power transmission therebetween).

When the transmission 60 is abnormal and the shift position SP is a forward position, transition to fail-safe first or third forward gear of the transmission 60 is effected as follows: For fail-safe first gear, the on-off solenoid SC is turned off and the on-off solenoid SC2 is turned on. As a result, the source pressure from the pressure regulation mechanism 92 acts on the clutch C1 through the oil paths 93, 95b (by bypassing the linear solenoid valve SL1), and acts on the brake B2 through the oil paths 97, 95f (by bypassing the linear solenoid valve SL4). Thus, transition to fail-safe first gear is effected by engaging the clutch C1 and the brake B2 and disengaging the clutch C2 and the brake B1. For fail-safe third gear, both the on-off solenoids SC1, SC2 are turned off. As a result, the source pressure from the pressure regulation mechanism 92 acts on the clutch C1 through the oil paths 93, 95b (by bypassing the linear solenoid valve SL1), and acts on the clutch C2 through the oil paths 98, 95d (by bypassing the linear solenoid valve SL2). Thus, transition to fail-safe third gear is effected by engaging the clutches C1, C2 and disengaging the brakes B1, B2.

The battery 50 is configured as a lithium-ion secondary battery or a nickel-hydrogen secondary battery, for example, and is connected to the inverters 41, 42 through the power lines 54. The battery 50 is managed by a battery electronic control unit (hereinafter referred to as a battery ECU) 52.

Although this is not shown, the battery ECU 52 is configured as a microprocessor having a CPU as a main component, and includes, other than the CPU, an ROM that stores a processing program, an RAM that temporarily stores data, input and output ports, and a communication port. Signals from various sensors required to manage the battery 50 are input into the battery ECU 52 through the input port. Examples of the signals input into the battery ECU 52 include a voltage Vb of the battery 50 from a voltage sensor 51a installed between terminals of the battery 50, a current Ib of the battery 50 from a current sensor 51b mounted on an output terminal of the battery 50, and a temperature Tb of the battery 50 from a temperature sensor 51c mounted on the battery 50. The battery ECU 52 is connected to the HVECU 70 through the communication port. The battery ECU 52 calculates a state of charge SOC on the basis of an integrated value of the current Ib of the battery 50 from the current sensor 51b. The state of charge SOC is a ratio of a capacity of electric power that can be discharged from the battery 50 to the total capacity of the battery 50.

Although this is not shown, the HVECU 70 is configured as a microprocessor having a CPU as a main component, and includes, other than the CPU, an ROM that stores a processing program, an RAM that temporarily stores data, input and output ports, and a communication port. Signals from various sensors are input into the HVECU 70 through the input port. Examples of the signals input into the HVECU 70 include a rotation speed Nout of the output shaft 62 from a rotation speed sensor 69 mounted on the output shaft 62 (driving shaft 36) of the transmission 60, an ignition signal from an ignition switch 80, and the shift position SP from a shift position sensor 82 that detects an operation position of a shift lever 81. Examples further include an accelerator position Acc from an accelerator pedal position sensor 84 that detects an amount of pressing on an accelerator pedal 83, a brake pedal position BP from a brake pedal position sensor 86 that detects an amount of pressing on a brake pedal 85, and a vehicle speed V from a vehicle speed sensor 88. Various control signals are output from the HVECU 70 through the output port. Examples of the signals output from the HVECU 70 include a control signal for the hydraulic control device 90 of the transmission 60. As described above, the HVECU 70 is connected to the engine ECU 24, the motor ECU 40, and the battery ECU 52 through the communication port.

The shift positions SP include a parking position (P-position), a reverse position (R-position), a neutral position (N-position), and a forward position (D-position).

In the hybrid automobile 20 of the embodiment thus configured, the engine 22 and the motors MG1, MG2 (hereinafter collectively referred to as a hybrid unit) and the transmission 60 are controlled so that the hybrid automobile 20 travels in a hybrid travel (HV travel) mode or an electrically driven travel (EV travel) mode. Here, the HV travel mode is a mode in which the hybrid automobile 20 travels with the engine 22 operating. The EV travel mode is a mode in which the hybrid automobile 20 travels without the engine 22 operating. In the following, control of the transmission 60, control of the hybrid unit in the HV travel mode, and control of the hybrid unit in the EV travel mode will be described.

Figure 6:
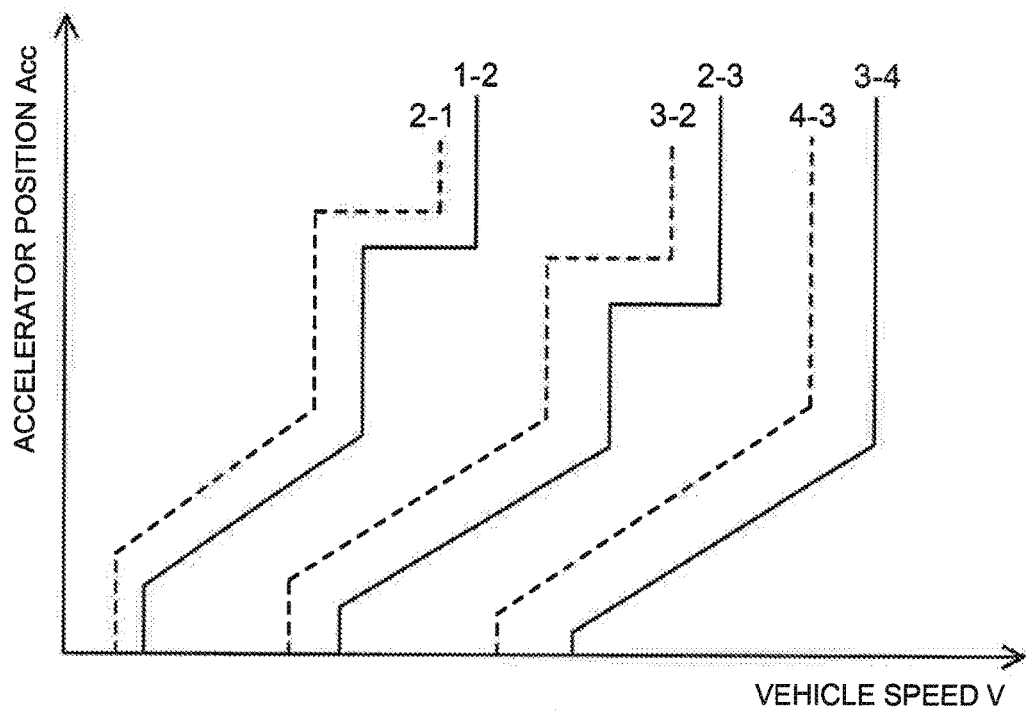
FIG. 6 is a view illustrating an example of a gear change map.

To control the transmission 60, when the shift position SP is the D-position, the HVECU 70 sets target gear Gs* of the transmission 60 on the basis of the accelerator position Ace, the vehicle speed V, and the gear change map of FIG. 6, and controls the transmission 60 (hydraulic control device 90) so that gear Gs of the transmission 60 shifts into the target gear Gs*. Specifically, when the gear Gs of the transmission 60 is the same as the target gear Gs*, the HVECU 70 holds the current gear Gs. The HVECU 70 upshifts when the gear Gs is gear of lower vehicle speed (lower gear) than the target gear Gs*, and downshifts when the gear Gs is gear of higher vehicle speed (higher gear) than the target gear Gs*. In the gear change map of FIG. 6, the solid lines 1-2, 2-3, and 3-4 show lines of upshift of the transmission 60, while the dashed lines 2-1, 3-2, and 4-3 show lines of downshift of the transmission 60. When the shift position SP is the R-position, the HVECU 70 controls the transmission 60 (hydraulic control device 90) so that the gear Gs of the transmission 60 shifts into reverse gear (so that the transmission 60 is held in reverse gear).

To control the hybrid unit in the HV travel mode, first, the HVECU 70 sets a required torque Tout* required for the driving shaft 36 (the output shaft 62 of the transmission 60) on the basis of the accelerator position Ace, the brake pedal position BP, and the vehicle speed V. Next, the HVECU 70 calculates a temporary torque Tintmp as a temporary value of a required torque Tin* required for the input shaft 61 of the transmission 60, by dividing the set required torque Tout* by a target gear ratio Gr* corresponding to the target gear Gs* of the transmission 60. Then, the HVECU 70 sets the required torque Tin* required for the input shaft 61 of the transmission 60 by restricting the calculated temporary torque Tintmp by upper and lower limit torques Tinmax, Tinmin (by defining upper and lower limits). After thus setting the required torque Tin*, the HVECU 70 calculates required power Pin* required for the input shaft 61 of the transmission 60 by multiplying the required torque Tin* by the rotation speed Nm2 of the motor MG2 (the rotation speed of the input shaft 61 of the transmission 60). Next, the HVECU 70 calculates required power Pe* required for the engine 22 by subtracting, from the calculated required power Pin*, charge-discharge required power Pb* (that is a positive value when electric power is discharged from the battery 50) based on the state of charge SOC of the battery 50. Then, the HVECU 70 sets a target speed Ne* and a target torque Te* for the engine 22 and torque commands Tm1*, Tm2* for the motors MG1, MG2 so that the required power Pe* is output from the engine 22 and that the required torque Tin* is output from the input shaft 61 of the transmission 60. The HVECU 70 sends the target speed Ne* and the target torque Te* for the engine 22 to the engine ECU 24, and sends the torque commands Tm1*, Tm2* for the motors MG1, MG2 to the motor ECU 40. Upon receiving the target rotation speed Ne* and the target torque Te* for the engine 22, the engine ECU 24 controls the amount of intake air, fuel injection, and ignition of the engine 22 so that the engine 22 is operated on the basis of the target speed Ne* and the target torque Te*. Upon receiving the torque commands Tm1*, Tm2* for the motors MG1, MG2, the motor ECU 40 controls switching of the plurality of switching elements of the inverters 41, 42 so that the motors MG1, MG2 are driven according to the torque commands Tm1*, Tm2*.

To control the hybrid unit in the EV travel mode, first, the HVECU 70 sets the required torque Tin* for the input shaft 61 of the transmission 60, as in controlling the hybrid unit in the HV travel mode. Next, the HVECU 70 sets the value of the torque command Tm1* for the motor MG1 to 0, and sets the torque command Tm2* for the motor MG2 so that the required torque Tin* is output to the input shaft 61 of the transmission 60, and sends the set torque commands Tm1*, Tm2* for the motors MG1, MG2 to the motor ECU 40. Control of the inverters 41, 42 by the motor ECU 40 has already been described above.

Figure 7:
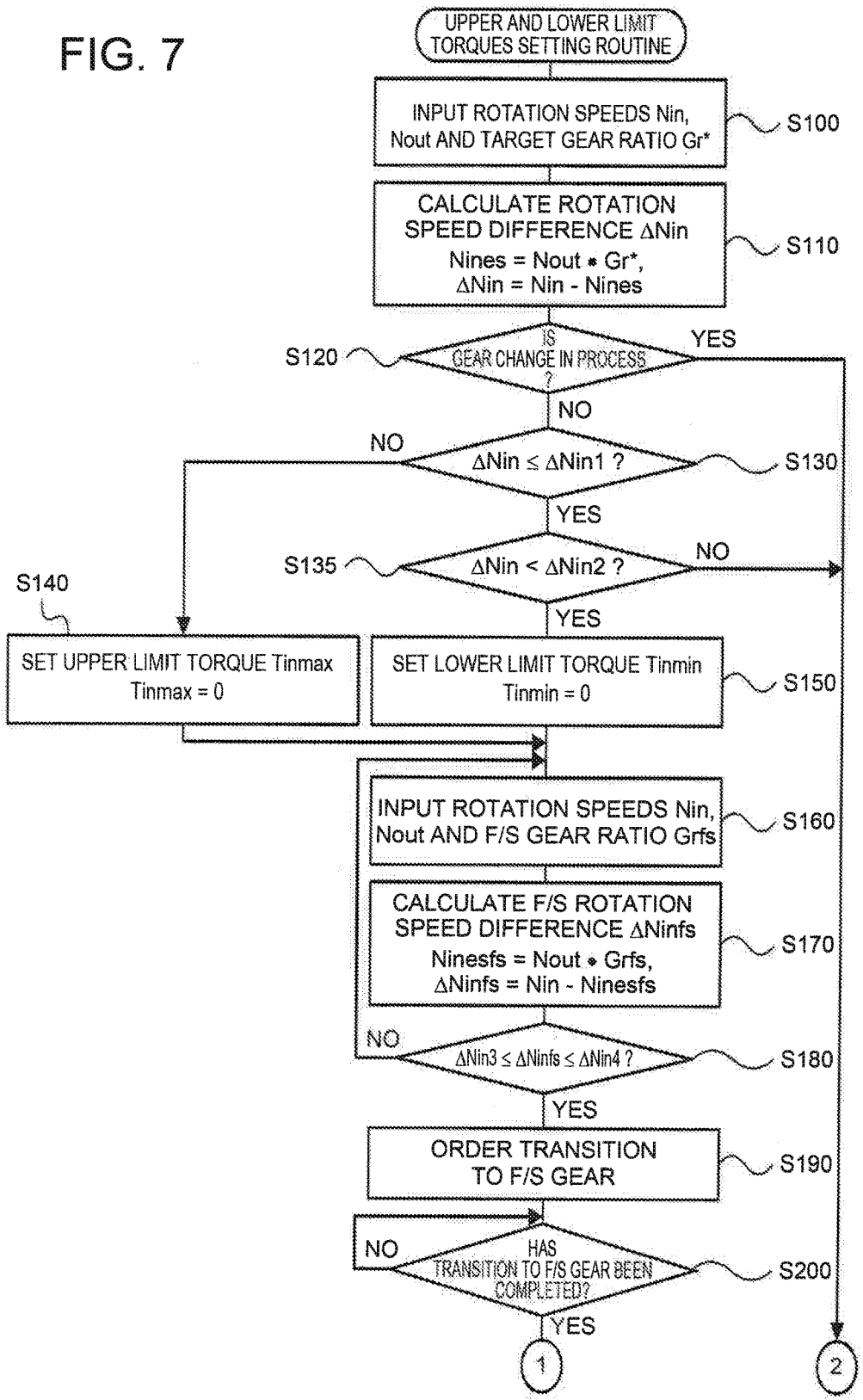
FIG. 7 is a flowchart showing an example of an upper and lower limit torques setting routine executed by an HVECU 70 of the embodiment.
Figure 8:
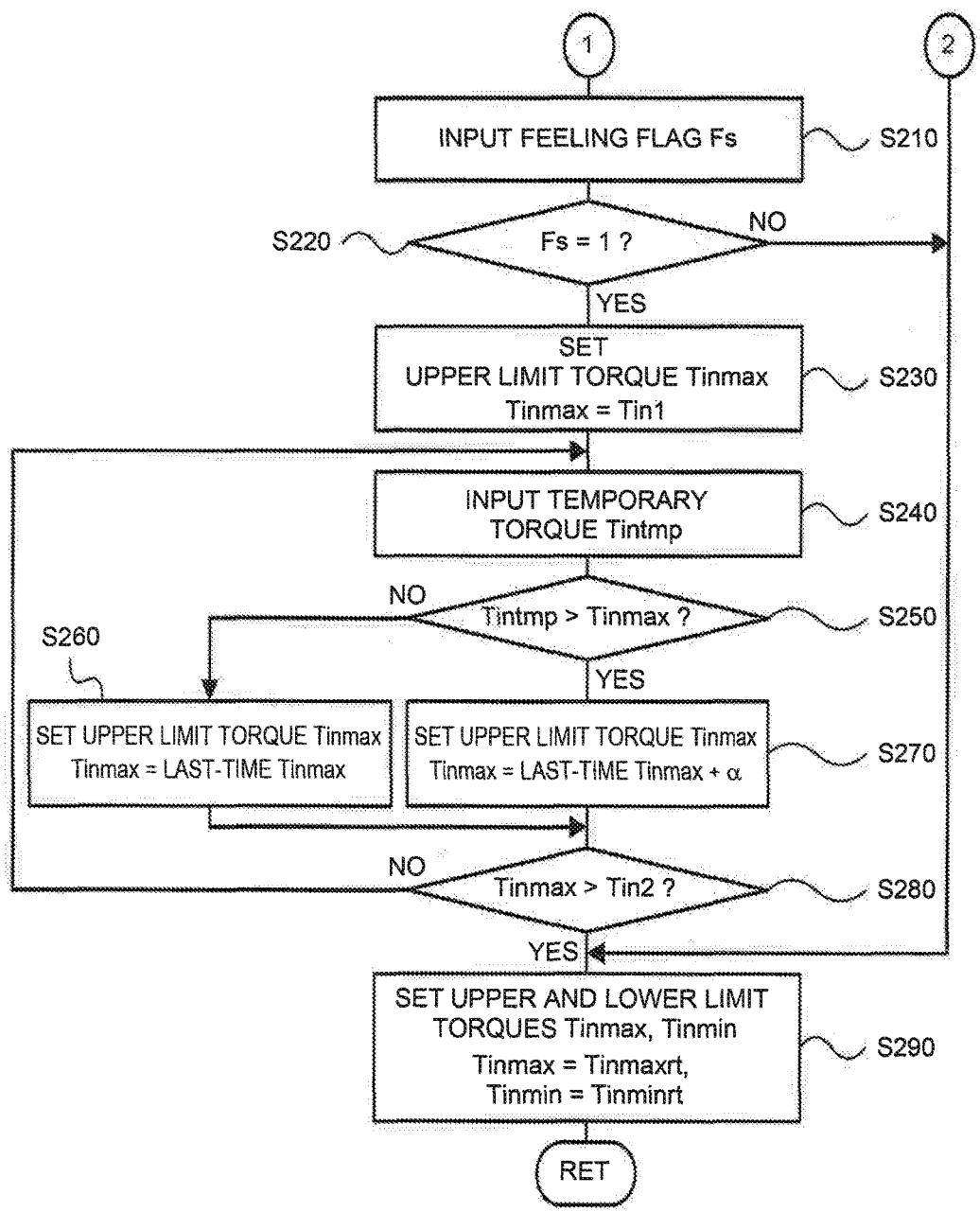
FIG. 8 is a flowchart showing an example of the upper and lower limit torques setting routine executed by the HVECU 70 of the embodiment.

Next, actions in the hybrid automobile 20 of the embodiment thus configured, more particularly, actions for setting the upper and lower limit torques Tinmax, Tinmin for the input shaft 61 of the transmission 60 will be described. FIG. 7 and FIG. 8 are a flowchart showing an example of an upper and lower limit torques setting routine that is executed by the HVECU 70 of the embodiment. This routine is repeatedly executed.

When the upper and lower limit torques setting routine of FIG. 7 and FIG. 8 is started, first, the HVECU 70 inputs the rotation speeds Nin, Nout of the input shaft 61 and the output shaft 62 of the transmission 60 and the target gear ratio Gr* of the transmission 60 (step S100). Here, the rotation speed Nm2 of the motor MG2 calculated on the basis of the rotation position of the rotor of the motor MG2 from the rotation position detection sensor 44 is input as the rotation speed Nin of the input shaft 61 of the transmission 60. A value detected by the rotation speed sensor 69 is input as the rotation speed Nout of the output shaft 62 of the transmission 60. A value corresponding to the target gear Gs* of the transmission 60 is input as the target gear ratio Gr* of the transmission 60.

After thus inputting the data, the HVECU 70 calculates an estimated rotation speed Nines of the input shaft 61 as a product of the rotation speed Nout of the output shaft 62 of the transmission 60 and the target gear ratio Gr* of the transmission 60, and calculates a rotation speed difference Δ Nin by subtracting the estimated rotation speed Nines from the rotation speed Nin of the input shaft 61 (the rotation speed Nm2 of the motor MG2) (step S110).

Next, the HVECU 70 determines whether gear change (upshift or downshift) of the transmission 60 is in process (step S120). In the embodiment, gear change of the transmission 60 being in process corresponds to a period from the start of a gear change process in the transmission 60 until the gear change process in the transmission 60 ends or a predetermined time Tsc elapses. Here, for example, a gear change process in the transmission 60 starts when the target gear Gs* and the gear Gs of the transmission 60 do not match. For example, a gear change process in the transmission 60 ends when an absolute value of the rotation speed difference Δ Nin decreases to or below a threshold value Δ Nin0. For the threshold value Δ Nin0, for example, about several tens of rpm can be used. For the predetermined time Tsc, for example, about several hundred msec can be used as a time that is slightly longer than a time assumed to be required for a gear change process in the transmission 60.

When it is determined in step S120 that gear change of the transmission 60 is in process, the HVECU 70 sets upper and lower limit rated values Tinmaxrt, Tinminrt respectively for the upper and lower limit torques Tinmax, Tinmin of the input shaft 61 of the transmission 60 (step S290), and ends the current routine. Here, the upper and lower limit rated values Tinmaxrt, Tinminrt are determined on the basis of the specifications of the hybrid unit and the transmission 60.

When it is determined in step S120 that gear change of the transmission 60 is not in process, the HVECU 70 compares the rotation speed difference Δ Nin with a positive threshold value Δ Nin1 and a negative threshold value Δ Nin2 (steps S130, S135). Here, the threshold value Δ Nin1 is a threshold value that is used to determine whether an unintended rise in the rotation speed Nin of the input shaft 61 is occurring, and for example, 400 rpm, 500 rpm, or 600 rpm can be used as the threshold value Δ Nin1. The threshold value Δ Nin2 is a threshold value that is used to determine whether an unintended decrease in the rotation speed Nin of the input shaft 61 is occurring, and for example, −600 rpm, −500 rpm, or −400 rpm can be used as the threshold value Δ Nin2.

Here, an intended rise or decrease in the rotation speed Nin of the input shaft 61 of the transmission 60 is attributable, for example, to disengagement or engagement of engaging elements of the plurality of engaging elements that have been engaged or disengaged due to electrical or mechanical abnormality of the linear solenoid valves SL1 to SL4, or to failure in normally engaging or disengaging engaging elements that should be engaged or disengaged in a gear change process.

An unintended rise in the rotation speed Nin of the input shaft 61 occurs, for example, in the following cases: (A) While the accelerator is applied, one of the engaging elements of the transmission 60 that has been engaged is disengaged and the transmission 60 enters a neutral state (a state where power is not transmitted between the input shaft 61 and the output shaft 62). As the required torque Tin* is positive, the rotation speed Nin of the input shaft 61 has become relatively high compared with the estimated rotation speed Nines (=Nout·Gr*). (B) The accelerator having been applied is released and the brake is applied, and the target gear Gs* of the transmission 60 is switched to higher gear. Although the transmission 60 tries to upshift, engaging elements of the transmission 60 that have been engaged and should be disengaged are not disengaged (upshift is not completed) before the predetermined time Tsc elapses. Meanwhile, the estimated rotation speed Nines (Nout·Gr*) of the input shaft 61 has become relatively low compared with the rotation speed Nin. For example, the case (A) occurs when either the clutch C1 or the brake B1 that has been engaged is disengaged while the accelerator is applied and the transmission 60 is in second gear. For example, the case (B) occurs when the accelerator that has been applied is released and the brake is applied while the transmission 60 is in second gear, and although the transmission 60 tries to upshift to third gear, the brake B1 fails to be disengaged.

An unintended decrease in the rotation speed Nin of the input shaft 61 occurs, for example, in the following case: (C) One of the engaging elements of the transmission 60 that has been engaged is disengaged while the brake is applied, and the transmission 60 enters a neutral state. As the required torque Tin* is negative, the rotation speed Nin of the input shaft 61 has become relatively low compared with the estimated rotation speed Nines. For example, the case (C) occurs when either the clutch C1 or the clutch C2 that has been engaged is disengaged while the brake is applied and the transmission 60 is in third gear.

When the rotation speed difference Δ Nin is not smaller than the threshold value Δ Nin2 nor larger than the threshold value Δ Nin1 in steps S130, S135, the HVECU 70 determines that neither an unintended rise nor an unintended decrease in the rotation speed Nin of the input shaft 61 of the transmission 60 is occurring, and sets the upper and lower limit rated values Tinmaxrt, Tinminrt respectively for the upper and lower limit torques Tinmax, Tinmin of the input shaft 61 of the transmission 60 (step S290), and ends the current routine.

When the rotation speed difference Δ Nin is larger than the positive threshold value Δ Nin1 in step S130, the HVECU 70 determines that an unintended rise in the rotation speed Nin of the input shaft 61 of the transmission 60 is occurring, and sets the value of the upper limit torque Tinmax of the input shaft 61 of the transmission 60 to 0 (step S140). Thus, when an unintended rise in the rotation speed Nin of the input shaft 61 of the transmission 60 is detected while the upper and lower limit torques Tinmax, Tinmin are respectively the upper and lower limit rated values Tinmaxrt, Tinminrt, the HVECU 70 changes the value of the upper limit torque Tinmax to 0 (starts to restrict the upper limit torque Tinmax), while holding the lower limit torque Tinmin. When the value of the upper limit torque Tinmax is thus changed to 0, the torque applied to the input shaft 61 becomes equal to or smaller than 0, so that the rotation speed Nin of the input shaft 61 decreases gradually due to rotation resistance of the motor MG2 etc.

When the rotation speed difference Δ Nin is smaller than the negative threshold value Δ Nin2 in step S135, the HVECU 70 determines that an unintended decrease in the rotation speed Nin of the input shaft 61 of the transmission 60 is occurring, and sets the value of the lower limit torque Tinmin of the input shaft 61 of the transmission 60 to 0 (step S150). Thus, when an unintended decrease in the rotation speed Nin of the input shaft 61 of the transmission 60 is detected while the upper and lower limit torques Tinmax, Tinmin are respectively the upper and lower limit rated values Tinmaxrt, Tinminrt, the HVECU 70 changes the value of the lower limit torque Tinmin to 0 (starts to restrict the lower limit torque Tinmin), while holding the upper limit torque Tinmax. When the value of the lower limit torque Tinmin is thus changed to 0, the value of the torque applied to the input shaft 61 becomes equal to or larger than 0, so that the decrease in the rotation speed Nin of the input shaft 61 is suppressed.

After changing the value of the upper limit torque Tinmax to 0 in step S140 or changing the value of the lower limit torque Tinmin to 0 in step S150, the HVECU 70 inputs the rotation speeds Nin, Nout of the input shaft 61 and the output shaft 62 of the transmission 60 and a fail-safe gear ratio Grfs of the transmission 60 (step S160). How to input the rotation speeds Nin, Nout of the input shaft 61 and the output shaft 62 of the transmission 60 has already been described above. A value corresponding to the fail-safe gear Gsfs is input as the fail-safe gear ratio Grfs of the transmission 60. In this embodiment, the fail-safe gear Gsfs is fail-safe first gear when the vehicle speed V is not higher than a threshold value Vref (e.g., about several km/h to ten and several km/h), and the fail-safe gear Gsfs is fail-safe third gear when the vehicle speed V is higher than the threshold value Vref.

After thus inputting the data, the HVECU 70 calculates a fail-safe estimated rotation speed Ninesfs of the input shaft 61 as a product of the rotation speed Nout of the output shaft 62 of the transmission 60 and the fail-safe gear ratio Grfs of the transmission 60, and calculates a fail-safe rotation speed difference Δ Ninfs by subtracting the fail-safe estimated rotation speed Ninesfs from the rotation speed Nin of the input shaft 61 (step S170), and compares the calculated fail-safe rotation speed difference Δ Ninfs with a negative threshold value Δ Nin3 and a positive threshold value Δ Nin4 (step S180). Here, the threshold values Δ Nin3, Δ Nin4 are threshold values that are used to determine whether the rotation speed Nin of the input shaft 61 has approached the fail-safe estimated rotation speed Ninesfs. For the threshold value Δ Nin3, a value equal to or larger (having a smaller absolute value) than the threshold value Δ Nin2, for example, −120 rpm −100 rpm, or −80 rpm can be used. For the threshold value Δ Nin4, a value equal to or smaller than the threshold value Δ Nin1, for example, 80 rpm, 100 rpm, or 120 rpm can be used.

When the fail-safe rotation speed difference Δ Ninfs is smaller than the negative threshold value Δ Nin3 or larger than the positive threshold value Δ Nin4 in step S180, the HVECU 70 determines that the rotation speed Nin of the input shaft 61 has not approached the fail-safe estimated rotation speed Ninesfs, and returns to step S160. On the other hand, when the fail-safe rotation speed difference Δ Ninfs is not smaller than the threshold value Δ Nin3 nor larger than the threshold value Δ Nin4 in step S180, the HVECU 70 determines that the rotation speed Nin of the input shaft 61 has approached the fail-safe estimated rotation speed Ninesfs, and sets the fail-safe gear Gsfs of the transmission 60 to the target gear Gs* (step S190), and waits for the gear Gs of the transmission 60 to shift into the target gear Gs* (gear Gsfs), i.e., wait for transition to the gear Gsfs to be effected (step S200).

When the gear Gs of the transmission 60 has shifted into the target gear Gs*, i.e., transition to the fail-safe gear Gsfs has been effected in step S200, the HVECU 70 inputs a feeling flag Fs (step S210). Here, a flag of which the value is set to 1 when a driver is assumed to have felt a decrease in a torque applied to the driving wheels 39a, 39b (has an experience of that feeling) while the value of the upper limit torque Tinmax is restricted to 0, and of which the value is set to 0 when it is not assumed so, is input as the feeling flag Fs through the feeling flag setting routine of FIG. 9 that is executed by the HVECU 70. Now, the description of the upper and lower limit torques setting routine of FIG. 7 and FIG. 8 will be interrupted, and the feeling flag setting routine of FIG. 9 will be described. The feeling flag setting routine of FIG. 9 is repeatedly executed by the HVECU 70 in parallel with the upper and lower limit torques setting routine of FIG. 7 and FIG. 8.

Figure 9:
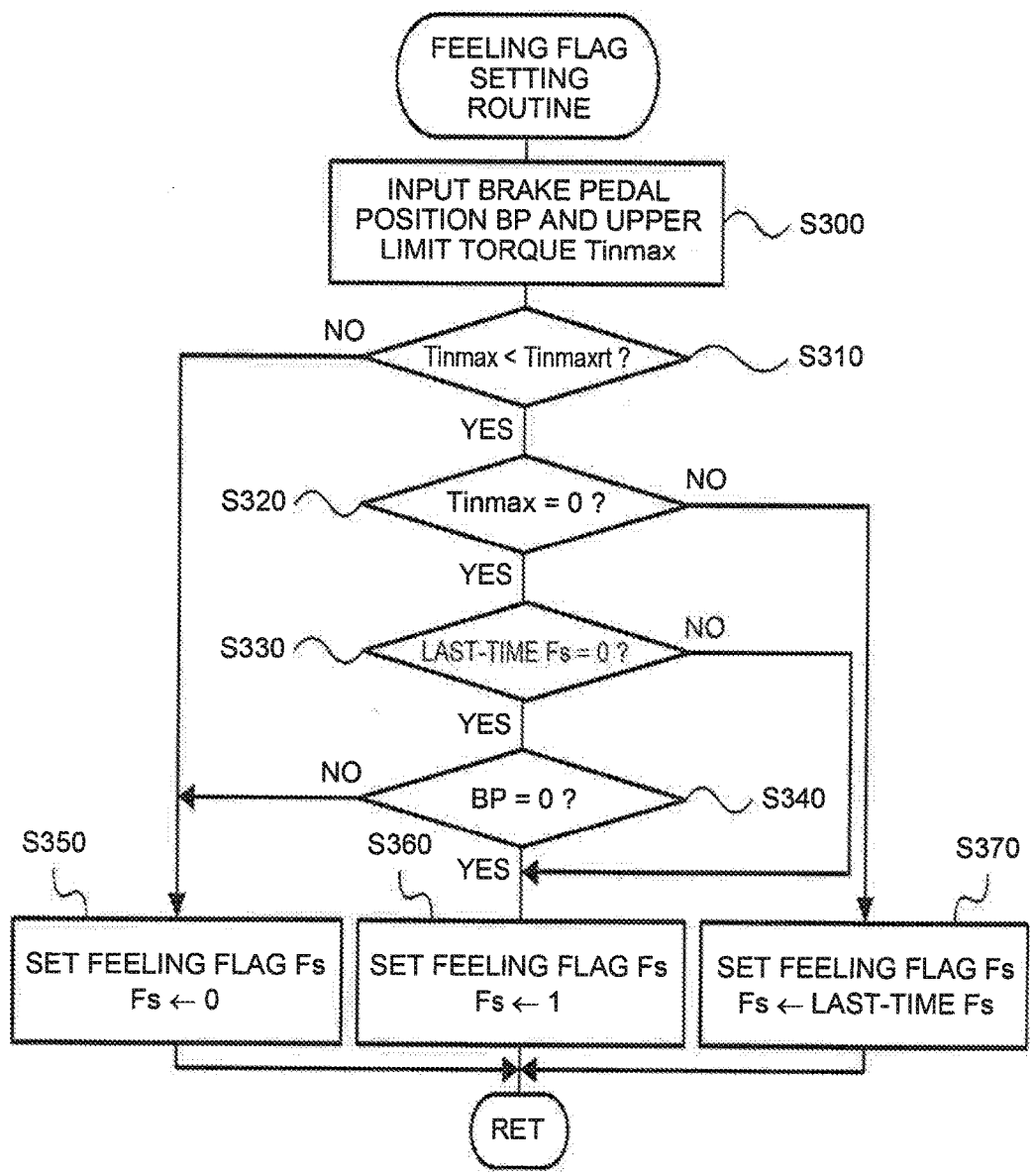
FIG. 9 is a flowchart showing an example of a feeling flag setting routine executed by the HVECU 70 of the embodiment.

When the feeling flag setting routine of FIG. 9 is started, first, the HVECU 70 inputs the brake pedal position BP and the upper limit torque Tinmax (step S300). Here, a value detected by the brake pedal position sensor 86 is input as the brake pedal position BP. A value that is set through the upper limit torque setting routine of FIG. 7 and FIG. 8 is input as the upper limit torque Tinmax.

After thus inputting the data, the HVECU 70 determines whether the input upper limit torque Tinmax is equal to the upper limit rated value Tinmaxrt or smaller than the upper limit rated value Tinmaxrt (step S310). When the upper limit torque Tinmax is equal to the upper limit rated value Tinmaxrt, the HVECU 70 sets the value of the feeling flag Fs to 0 (step S350), and ends the current routine.

When the upper limit torque Tinmax is smaller than the upper limit rated value Tinmaxrt in step S310, the HVECU 70 determines whether the value of the upper limit torque Tinmax is 0 (step S320). When the value of the upper limit torque Tinmax is 0, the HVECU 70 checks the value of the feeling flag that was set when the routine was executed last time (last-time Fs) (step S330), and when the value of the last-time feeling flag (last-time Fs) is 0, the HVECU 70 determines whether the value of the brake pedal position BP is 0 (the brake is released) (step S340). This process is a process of determining whether the driver is assumed to have felt a decrease in the torque applied to the driving wheels 39a, 39b during a period from when the value of the upper limit torque Tinmax is set to 0 to the present time.

When the value of the brake pedal position BP is not 0 in step S340 (the brake is applied), the HVECU 70 determines that the driver is not assumed to have felt a decrease in the torque applied to the driving wheels 39a, 39b during the period from when the value of the upper limit torque Tinmax is restricted to 0 to the present time, and sets the value of the feeling flag Fs to 0 (step S350), and ends the current routine.

When the value of the brake pedal position BP is 0 (the brake is released) in step S340, the HVECU 70 determines that the driver is assumed to have felt a decrease in the torque applied to the driving wheels 39a, 39b during the period from when the value of the upper limit torque Tinmax is set to 0 to the present time, and sets the value of the feeling flag Fs to i, i.e., switches the value of the feeling flag Fs from 0 to 1 (step S360), and ends the current routine.

After thus setting the value of the feeling flag Fs to 1, when the value of the upper limit torque Tinmax in steps S310, S320 is 0 in the routine executed next time, the HVECU 70 determines that the value of the last-time feeling flag (last-time Fs) is 1 in step S330 and holds the value of the feeling flag Fs at 1 (step S360), and ends the current routine. Thus, when the value of the feeling flag Fs is set to 1, the value of the feeling flag Fs is held at 1 even when the brake is applied thereafter.

When the upper limit torque Tinmax is smaller than the upper limit rated value Tinmaxrt in step S310 and the value of the upper limit torque Tinmax is not 0 in step S320, the HVECU 70 holds the last-time feeling flag (last-time Fs) (step S370), and ends the current routine.

Here, situations will be considered where abnormality has occurred in the transmission 60 respectively during acceleration and steady travel with the shift position SP at a forward position, during starting out (starting out with a creep torque), during deceleration, and during standstill.

During acceleration and steady travel, the driver is pressing the accelerator pedal 83. Accordingly, when abnormality has occurred in the transmission 60 and the transmission 60 cannot produce an acceleration desired by the driver or cannot maintain steady travel, the driver is likely to feel a decrease in the torque applied to the driving wheels 39a, 39b and further press the accelerator pedal 83. When abnormality has occurred in the transmission 60 during starting out, the vehicle does not move when the brake that has been applied is released, so that the driver is likely to press the accelerator pedal 83 to move the vehicle. During deceleration, a braking torque corresponding to the brake pedal position BP and the vehicle speed V is exerted on the vehicle through coordination between the torque Tin (negative torque) applied to the input shaft 61 and a braking torque exerted by a hydraulic brake device (not shown) on the driving wheels 39a, 39b and idler wheels. If abnormality occurs in the transmission 60 during this process, the value of the lower limit torque Tinmin of the input shaft 61 is restricted to 0 and the value of the torque Tin is restricted to 0. However, as this amount of restriction can be made up for by an increase in the braking torque from the hydraulic brake device (not shown), the driver is unlikely to feel a decrease in the torque (driving torque) applied to the driving wheels 39a, 39b. During standstill, the driver is pressing the brake pedal 85 and is therefore unlikely to feel a decrease in the torque (driving torque) applied to the driving wheels 39a, 39b even if abnormality occurs in the transmission 60. Thus, if the vehicle is decelerating or stationary when abnormality occurs in the transmission 60, the driver does not feel a decrease in the torque (driving torque) applied to the driving wheels 39a, 39b, and is therefore sufficiently unlikely to press the accelerator pedal 83 harder than before the abnormality occurs in the transmission 60. In view of these situations, this embodiment uses a condition that the brake is released as a condition for switching the value of the feeling flag Fs from 0 to 1.

Now, the description of the upper limit torque setting routine of FIG. 7 and FIG. 8 will be resumed. After inputting the feeling flag Fs in step S210, the HVECU 70 checks the value of the input feeling flag Fs (step S220). The driver is not assumed to have felt a decrease in the torque applied to the driving wheels 39a, 39b (have an experience of that feeling) while the value of the upper limit torque Tinmax is restricted to 0, for example, in a case where the brake is continuously applied after the case (B) described above. The driver is assumed to have felt such a decrease, for example, in a case where the accelerator is continuously applied (the brake is continuously released) after the case (A) described above.

When the value of the feeling flag Fs is 0 in step S220, the HVECU 70 determines that the driver is not assumed to have felt a decrease in the torque applied to the driving wheels 39a, 39b (have an experience of that feeling) while the value of the upper limit torque Tinmax is restricted to 0, and sets the upper and lower limit rated values Tinmaxrt, Tinminrt respectively for the upper and lower limit torques Tinmax, Tinmin of the input shaft 61 of the transmission 60 (step S290), and ends the current routine. Thus, when the driver is not assumed to have felt a decrease in the torque applied to the driving wheels 39a, 39b (have an experience of that feeling) while the value of the upper limit torque Tinmax is restricted to 0 before the value of the upper limit torque Tinmax is returned from 0 to the upper limit rated value Tinmaxrt, the upper limit torque Tinmax is immediately returned to the upper limit rated value Tinmaxrt. It is therefore possible to more appropriately respond when the driver presses the accelerator pedal 83 thereafter.

When the value of the feeling flag Fs is 1 in step S210, the HVECU 70 determines that the driver is assumed to have felt a decrease in the torque applied to the driving wheels 39a, 39b (have an experience of that feeling) while the value of the upper limit torque Tinmax is restricted to 0, and sets a torque Tin1 for the upper limit torque Tinmax (step S230). Here, for the torque Tin1, for example, a torque corresponding to a creep torque Tc when converted at the output shaft 62 (driving shaft 36) of the transmission 60, i.e., a torque obtained by dividing the creep torque Tc by the gear ratio Gr corresponding to the target gear Gs* (gear Gsfs) can be used.

Next, the HVECU 70 inputs the temporary torque Tintmp required for the input shaft 61 of the transmission 60 (step S240). Here, a value obtained by dividing the required torque Tout* of the driving shaft 36 based on the accelerator position Acc, the brake pedal position BP, and the vehicle speed V by the target gear ratio Gr* of the transmission 60 is input as the temporary torque Tintmp.

After thus inputting the temporary torque Tintmp, the HVECU 70 compares the input temporary torque Tintmp with the upper limit torque Tinmax (step S250), and when the temporary torque Tintmp is not larger than the upper limit torque Tinmax, the HVECU 70 holds the upper limit torque Tinmax (step S260), and when the temporary torque Tintmp is larger than the upper limit torque Tinmax, the HVECU 70 updates the upper limit torque Tinmax by increasing the upper limit torque Tinmax by a predetermined value α (step S270). Next, the HVECU 70 compares the upper limit torque Tinmax with a torque Tin2 smaller than the upper limit rated value Tinmaxrt (step S280), and when the upper limit torque Tinmax is not larger than the torque Tin2, the HVECU 70 returns to step S240. Then, the HVECU 70 repeats the processes in steps S240 to S280, and when the upper limit torque Tinmax becomes larger than the torque Tin2, the HVECU 70 sets the upper and lower limit rated values Tinmaxrt, Tinminrt respectively for the upper and lower limit torques Tinmax, Tinmin of the input shaft 61 of the transmission 60 (step S290), and ends the current routine. Here, the predetermined value α is a rate value at which the upper limit torque Tinmax is gradually increased, and for example, 200 Nm/sec can be used as a value at which the driver does not feel a sudden acceleration. The torque Tin2 is a threshold value above which the upper limit torque Tinmax can be shifted to the upper limit rated value Tinmaxrt, and for example, a value corresponding to 70%, 80%, or 90% of the upper limit torque Tinmax can be used as the torque Tin2. Thus, when the driver is assumed to have felt a decrease in the torque applied to the driving wheels 39a, 39b (have an experience of that feeling) while the value of the upper limit torque Tinmax is restricted to 0 before the value of the upper limit torque Tinmax is returned from 0 to the upper limit rated value Tinmaxrt, the upper limit torque Tinmax is gradually returned to the upper limit rated value Tinmaxrt by rate processing. It is therefore possible to suppress a sudden acceleration the driver may feel, compared with when the upper limit torque Tinmax is immediately returned to the upper limit rated value Tinmaxrt.

Figure 10:
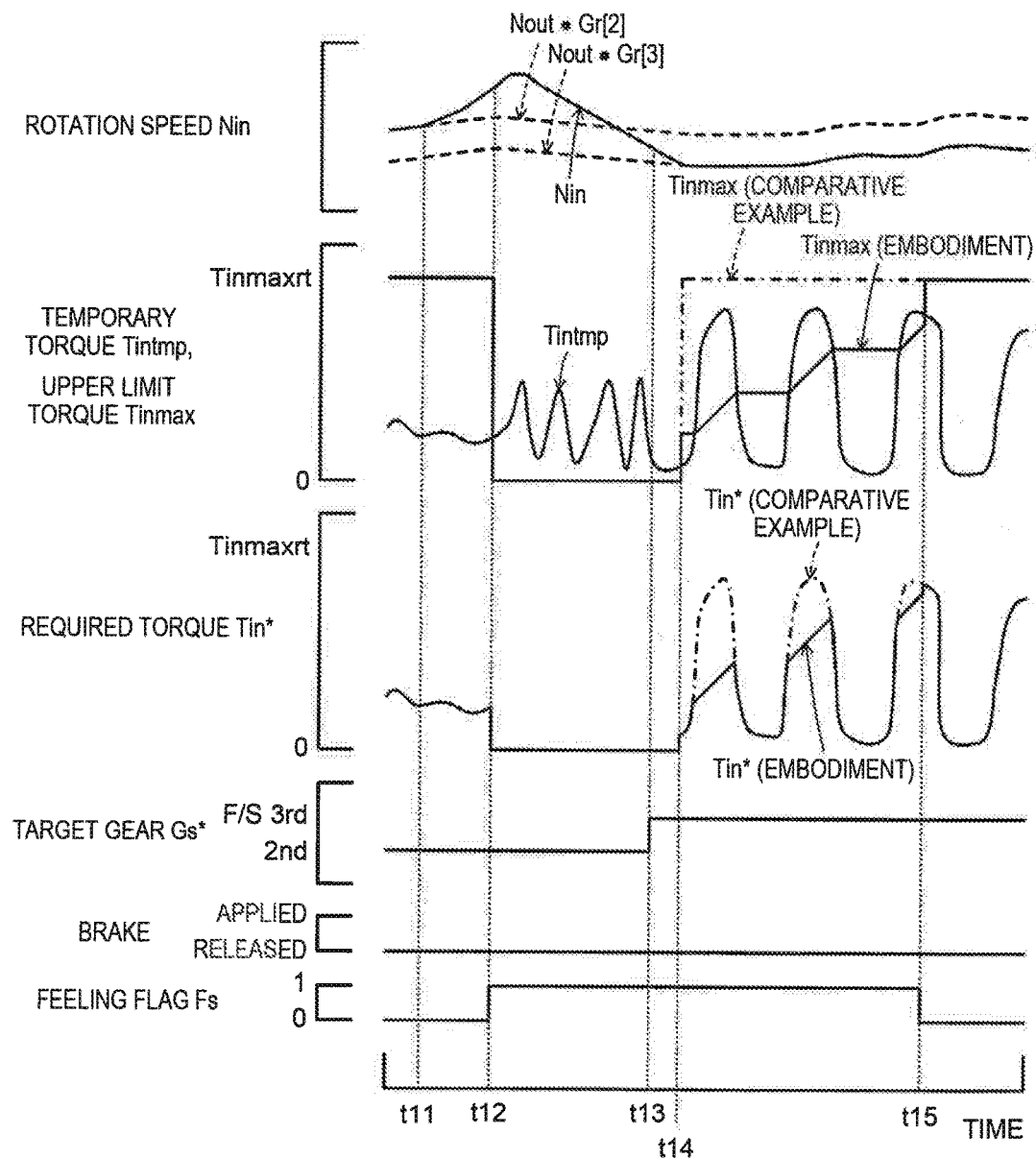
FIG. 10 is a view illustrating an example of a state where an unintended rise in a rotation speed Nin of an input shaft 61 has occurred while target gear Gs* of the transmission 60 is second gear.

FIG. 10 is a view illustrating an example of a state of the rotation speed Nin, the temporary torque Tintmp, the upper limit torque Tinmax, the required torque Tin*, the target gear Gs*, whether the brake is applied or released, and the feeling flag Fs when an unintended rise in the rotation speed Nin of the input shaft 61 has occurred while the target gear Gs* of the transmission 60 is second gear. In FIG. 10, reference signs Gr[2] and Gr[3] denote the gear ratios Gr when the transmission 60 is in second gear and third gear (fail-safe third gear), respectively. For the upper limit torque Tinmax and the required torque Tin*, the solid lines show those of the embodiment, and the dot-and-dash lines show those of a comparative example. As the comparative example, a case will be considered where the value of the upper limit torque Tinmax is always immediately returned from 0 to the upper limit rated value Tinmaxrt without using the feeling flag Fs. As shown in FIG. 10, when abnormality has occurred in the transmission 60 at time t11 while the target gear Gs* (and the gear Gs) of the transmission 60 is second gear, and it is determined at time t12 that an unintended rise in the rotation speed Nin of the input shaft 61 is occurring, the value of the upper limit torque Tinmax is restricted from the upper limit torque Tinmax to 0, and thereby the value of the required torque Tin* is also restricted to 0. Since the brake is released while the upper limit torque Tinmax is smaller than the upper limit rated value Tinmaxrt, the value of the feeling flag Fs is switched from 0 to 1 in the embodiment. In the comparative example, the feeling flag Fs is not set (not used). Thereafter, when the rotation speed Nin of the input shaft 61 decreases and the rotation speed Nin becomes close to the value (Nout·Gr[3]) at time t13, the fail-safe gear Gsfs (third gear) is set as the target gear Gs*, and transition to the target gear Gs* is effected. When transition to the fail-safe gear Gsfs is completed at time t14, in the comparative example, the upper limit torque Tinmax is immediately returned to the upper limit rated value Tinmaxrt. Thus, the required torque Tin* becomes relatively large when the driver presses hard on the accelerator pedal 83 immediately after the completion of transition to the fail-safe gear Gsfs, so that the driver may feel a sudden acceleration. In the embodiment, by contrast, the value of the upper limit torque Tinmax is gradually increased from 0 to the upper limit rated value Tinmaxrt after transition to the fail-safe gear Gsfs is completed at time t14. Thus, the required torque Tin* does not become so large even when the driver presses hard on the accelerator pedal 83 immediately after the completion of transition to the gear Gsfs. It is therefore possible to suppress a sudden acceleration the driver may feel.

In the hybrid automobile 20 of the embodiment having been described above, when the brake is released before the value of the upper limit torque Tinmax of the input shaft 61 of the transmission 60 is returned from 0 to the upper limit rated value Tinmaxrt, it is determined that the driver is assumed to have felt a decrease in the torque applied to the driving wheels 39a, 39b (have an experience of that feeling) while the value of the upper limit torque Tinmax is restricted to 0, and the value of the upper limit torque Tinmax is gradually returned to the upper limit rated value Tinmaxrt by rate processing. Thus, it is possible to suppress a sudden acceleration the driver may feel, compared with when the upper limit torque Tinmax is immediately returned to the upper limit rated value Tinmaxrt.

In the hybrid automobile 20 of the embodiment, the HVECU 70 sets the feeling flag Fs in accordance with the feeling flag setting routine of FIG. 9. However, the HVECU 70 may instead set the feeling flag Fs in accordance with any one of the feeling flag setting routines of FIG. 11 to FIG. 13. These routines will be described one by one below.

Figure 11:
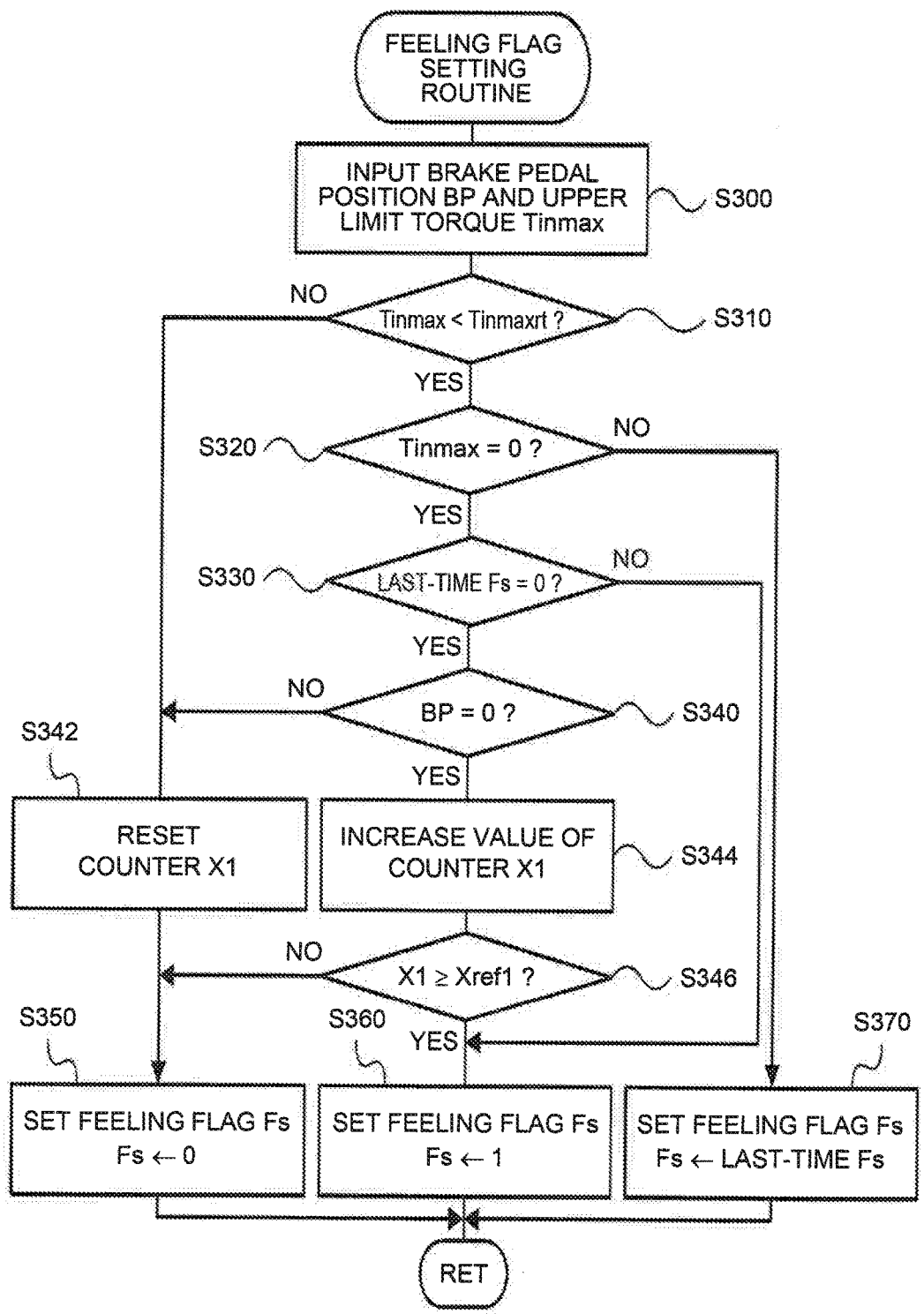
FIG. 11 is a flowchart showing an example of the feeling flag setting routine in a modified example.

The feeling flag setting routine of FIG. 11 will be described. Except that the processes in steps S342 to S346 are added, the feeling flag setting routine of FIG. 11 is the same as the feeling flag setting routine of FIG. 9. Therefore, the same processes will be denoted by the same step numbers while detailed description thereof will be omitted.

In the feeling flag setting routine of FIG. 11, when the upper limit torque Tinmax is equal to the upper limit rated value Tinmaxrt in step S310, the HVECU 70 resets a counter X1 to 0 (step S342), and sets the value of the feeling flag Fs to 0 (step S350), and ends the current routine.

Also when the value of the upper limit torque Tinmax is 0 in steps S310, S320, and the value of the last-time feeling flag (last-time Fs) is 0 in step S330, and the value of the brake pedal position BP is not 0 (the brake is applied) in step S340, the HVECU 70 resets the counter X1 to 0 (step S342), and sets the value of the feeling flag Fs to 0 (step S350), and ends the current routine.

When the value of the upper limit torque Tinmax is 0 in steps S310, S320, and the value of the last-time feeling flag (last-time Fs) is 0 in step S330, and the value of the brake pedal position BP is 0 (the brake is released) in step S340, the HVECU 70 updates the counter X1 by increasing the value of the counter X1 by 1 (step S344), and compares the updated counter X1 with a threshold value Cref1 (step S346). Here, for the threshold value Cref1, for example, a value corresponding to 400 msec, 500 msec, or 600 msec can be used. In this case, the process in step S346 is a process of determining whether a duration time for which the brake is released is not shorter than a time corresponding to the threshold value Cref1.

When the value of the counter X1 is smaller than the threshold value Cref1 in step S346, the HVECU 70 sets the value of the feeling flag Fs to 0 (step S350), and ends the current routine. On the other hand, when the value of the counter X1 is not smaller than the threshold value Cref1, the HVECU 70 sets the value of the feeling flag Fs to 1, i.e., switches the value of the feeling flag Fs from 0 to 1 (step S360), and ends the current routine.

In this case, when the brake is released for a very short time (e.g., within about 100 msec) while the value of the upper limit torque is restricted to 0, the HVECU 70 holds the value of the feeling flag Fs at 0. When the brake is released for a very short time, the driver may not have felt (recognized) a decrease in the torque applied to the driving wheels 39a, 39b. Therefore, the HVECU 70 holds the value of the feeling flag Fs at 0, and immediately returns the value of the upper limit torque Tinmax from 0 to the upper limit rated value Tinmaxrt. Thus, it is possible to more appropriately respond when the driver presses the accelerator pedal 83 thereafter.

In this modified example, as can be seen from the feeling flag setting routine of FIG. 11, in the case where the value of the upper limit torque Tinmax is 0 and the value of the last-time feeling flag (last-time Fs) is 0, the counter X1 is reset to 0 when the brake that has been released is applied while the value of the counter X1 is being increased (before the value of the counter X1 becomes equal to or larger than the threshold value Cref1). However, the HVECU 70 may also be configured so as not to reset the counter X1 when the brake is applied while the value of the counter X1 is being increased. In this case, the process in step S346 is a process of determining whether a cumulative time, not a duration time, for which the brake is released is not shorter than a time corresponding to the threshold value Cref1.

Figure 12:
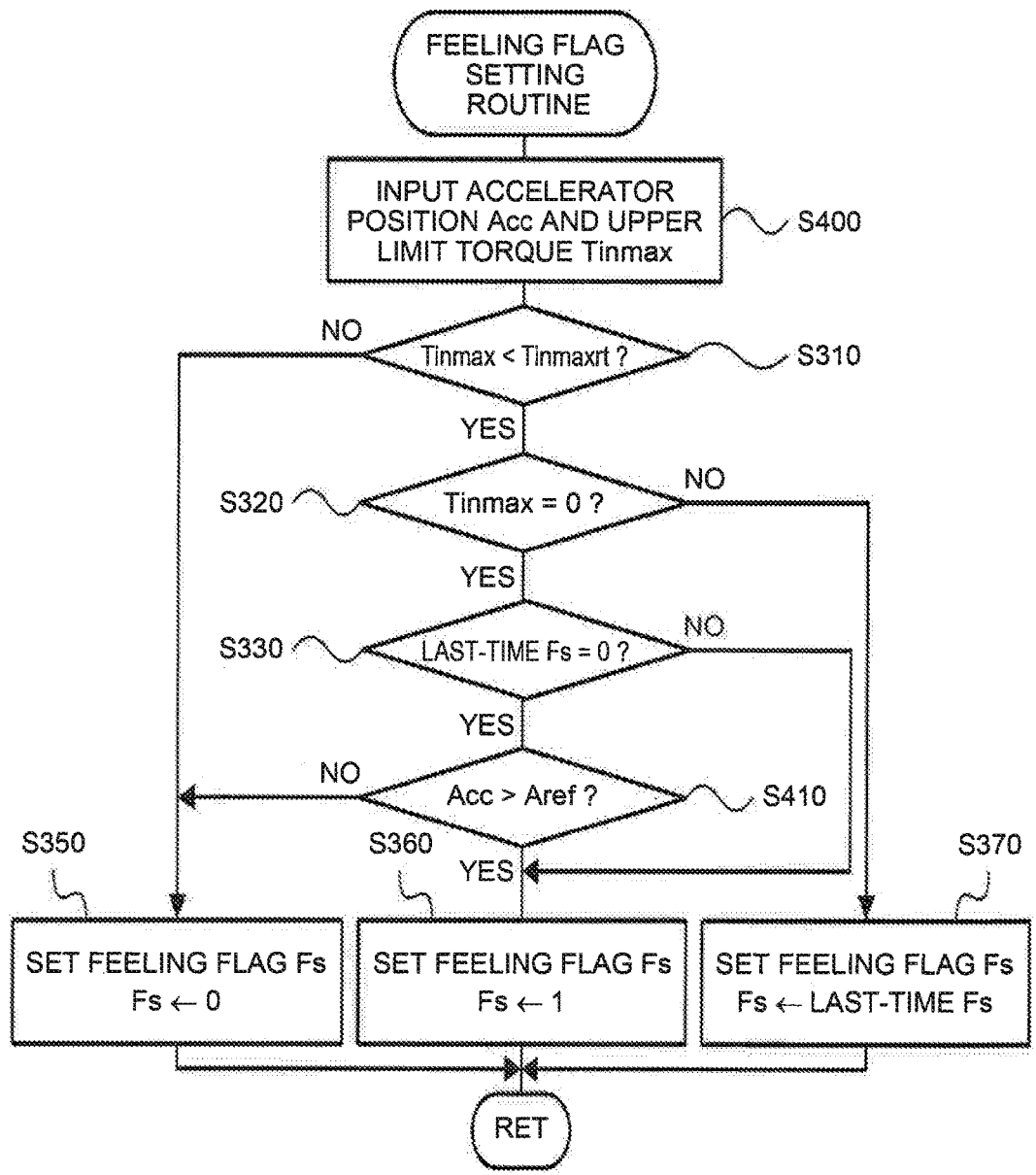
FIG. 12 is a flowchart showing an example of the feeling flag setting routine in another modified example.

Next, the feeling flag setting routine of FIG. 12 will be described. Except that the processes in steps S400, S410 are executed instead of the processes in steps S300, S340, the feeling flag setting routine of FIG. 12 is the same as the feeling flag setting routine of FIG. 9. Therefore, the same processes will be denoted by the same step numbers while detailed description thereof will be omitted.

In the feeling flag setting routine of FIG. 12, the HVECU 70 inputs the upper limit torque Tinmax as in the process in step S300 of the feeling flag setting routine of FIG. 9, and inputs the accelerator position Acc instead of the brake pedal position BP that is input in the process in step S300 (step S400). Here, a value detected by the accelerator pedal position sensor 84 is input as the accelerator position Ace. When the value of the upper limit torque Tinmax is 0 in steps S310, S320, and the value of the last-time feeling flag (last-time Fs) is 0 in step S330, the HVECU 70 compares the accelerator position Ace with a threshold value Aref (step S410). Here, for the threshold value Aref, for example, 8%, 10%, or 12% can be used. Like the process in step S340 of the feeling flag setting routine of FIG. 9, the process in step S410 is a process of determining whether the driver is assumed to have felt a decrease in the torque applied to the driving wheels 39a, 39b during the period from when the value of the upper limit torque Tinmax is restricted to 0 to the present time.

When the accelerator position Ace is not larger than the threshold value Aref in step S410, the HVECU 70 determines that the driver is not assumed to have felt a decrease in the torque applied to the driving wheels 39a, 39b during the period from when the value of the upper limit torque Tinmax is restricted to 0 to the present time, and sets the value of the feeling flag Fs to 0 (step S350), and ends the current routine.

When the accelerator position Ace is larger than the threshold value Aref in step S340, the HVECU 70 determines that the driver is assumed to have felt a decrease in the torque applied to the driving wheels 39a, 39b during the period from when the value of the upper limit torque Tinmax is restricted to 0 to the present time, and sets the value of the feeling flag Fs to 1, i.e., switches the value of the feeling flag Fs from 0 to 1 (step S360), and ends the current routine.

In this modified example, when the accelerator position Ace is larger than the threshold value Aref before the value of the upper limit torque Tinmax of the input shaft 61 of the transmission 60 is returned from 0 to the upper limit rated value Tinmaxrt, it is determined that the driver is assumed to have felt a decrease in the torque applied to the driving wheels 39a, 39b (have an experience of that feeling) while the value of the upper limit torque Tinmax is restricted to 0, and the upper limit torque Tinmax is gradually returned to the upper limit rated value Tinmaxrt by rate processing. Thus, as in the embodiment, it is possible to suppress a sudden acceleration the driver may feel, compared with when the upper limit torque Tinmax is immediately returned to the upper limit rated value Tinmaxrt.

Figure 13:
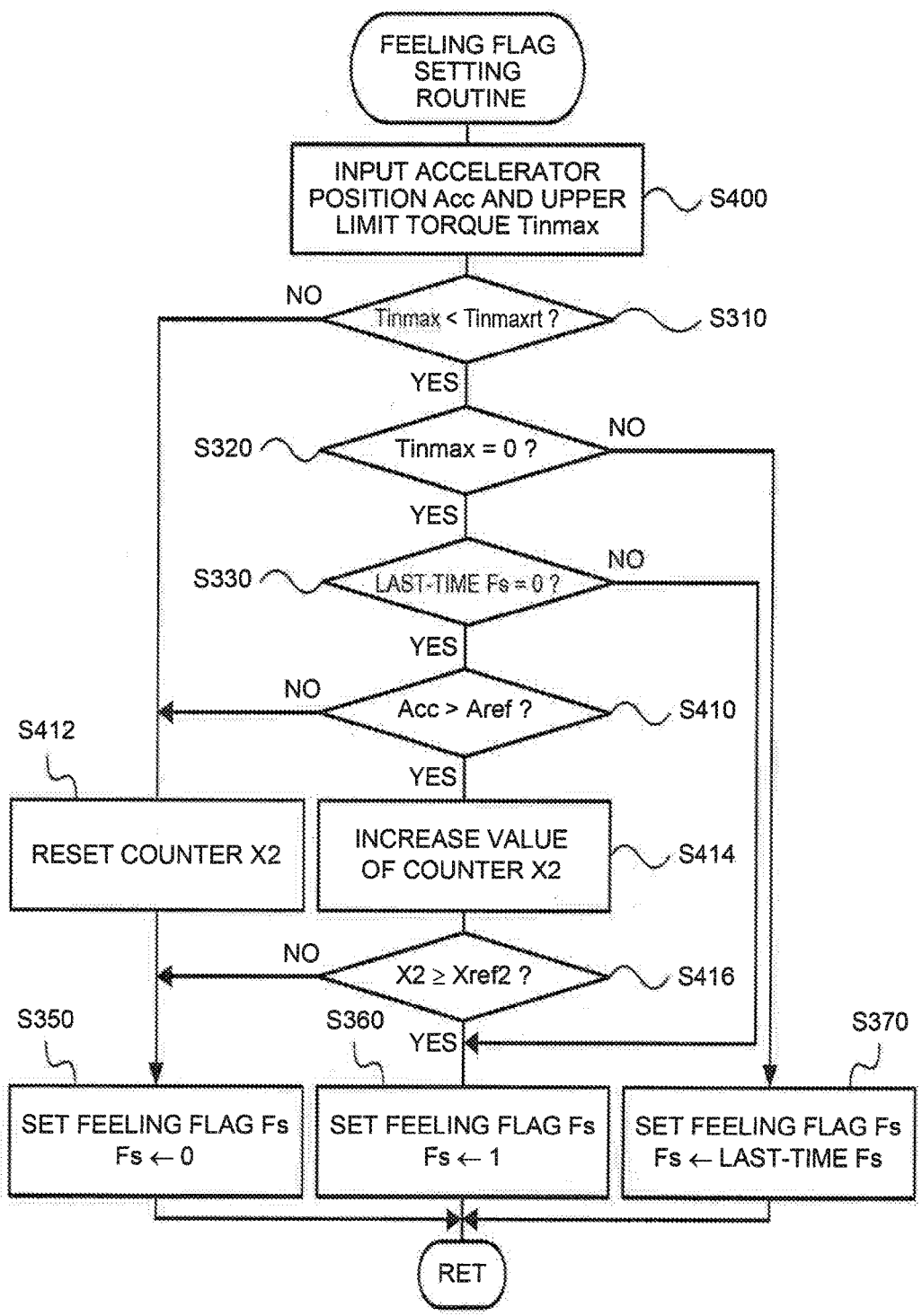
FIG. 13 is a flowchart showing an example of the feeling flag setting routine in yet another modified example.

Next, the feeling flag setting routine of FIG. 13 will be described. Except that the processes in steps S412 to S416 are added, the feeling flag setting routine of FIG. 13 is the same as the feeling flag setting routine of FIG. 12. Therefore, the same processes will be denoted by the same step numbers while detailed description thereof will be omitted. In the feeling flag setting routine of FIG. 13, when the upper limit torque Tinmax is equal to the upper limit rated value Tinmaxrt in step S310, the HVECU 70 resets a counter X2 to 0 (step S412), and sets the value of the feeling flag Fs to 0 (step S30), and ends the current routine.

Also when the value of the upper limit torque Tinmax is 0 in steps S310, S320, and the value of the last-time feeling flag (last-time Fs) is 0 in step S330, and the accelerator position Ace is not larger than the threshold value Aref in step S410, the HVECU 70 resets the counter X2 to 0 (step S412), and sets the value of the feeling flag Fs to 0 (step S350), and ends the current routine.

When the value of the upper limit torque Tinmax is 0 in steps S310, S320, and the value of the last-time feeling flag (last-time Fs) is 0 in step S330, and the accelerator position Acc is larger than the threshold value Aref in step S410, the HVECU 70 updates the counter X2 by increasing the value of the counter X2 by 1 (step S414), and compares the updated counter X2 with a threshold value Cref2 (step S416). Here, for the threshold value Cref2, for example, a value corresponding to 400 msec, 500 msec, or 600 msec can be used. In this case, the process in step S416 is a process of determining whether a duration time for which the accelerator position Acc is larger than the threshold value Aref is not shorter than a time corresponding to the threshold value Cref2.

When the value of the counter X2 is smaller than the threshold value Cref2 in step S416, the HVECU 70 sets the value of the feeling flag Fs to 0 (step S350), and ends the current routine. On the other hand, when the value of the counter X2 is not smaller than the threshold value Cref2, the HVECU 70 sets the value of the feeling flag Fs to 1, i.e., switches the value of the feeling flag Fs from 0 to 1 (step S360), and ends the current routine.

In this case, when the accelerator position Ace is larger than the threshold value Aref for a very short time (e.g., within about 100 msec) while the value of the upper limit torque Tinmax is restricted to 0, the HVECU 70 holds the value of the feeling flag Fs at 0. When the accelerator position Ace is larger than the threshold value Aref for a very short time, the driver may not have felt (recognized) a decrease in the torque applied to the driving wheels 39a, 39b. Therefore, the HVECU 70 holds the value of the feeling flag Fs at 0, and immediately returns the value of the upper limit torque Tinmax from 0 to the upper limit rated value Tinmaxrt. Thus, it is possible to more appropriately respond when the driver presses the accelerator pedal 83 thereafter.

In this modified example, as can be seen from the feeling flag setting routine of FIG. 13, in the case where the value of the upper limit torque Tinmax is 0 and the value of the last-time feeling flag (last-time Fs) is 0, the counter X2 is reset to 0 when the accelerator position Ace becomes equal to or smaller than the threshold value Aref while and the accelerator position Ace is larger than the threshold value Aref and the value of the counter X2 is being increased (before the value of the counter X2 becomes equal to or larger than the threshold value Cref2). However, the HVECU 70 may also be configured so as not to reset the counter X2 even when the accelerator position Ace becomes equal to or smaller than the threshold value Aref while the value of the counter X2 is being increased. In this case, the process in step S416 is a process of determining whether a cumulative time, not a duration time, for which the accelerator position Ace is larger than the threshold value Aref is not shorter than a time corresponding to the threshold value Cref2.

In the hybrid automobile 20 of the embodiment, in the case where the value of the feeling flag Fs is 1 before the value of the upper limit torque Tinmax of the input shaft 61 of the transmission 60 is returned from 0 to the upper limit rated value Tinmaxrt, the upper limit torque Tinmax is held when the temporary torque Tintmp of the input shaft 61 is not larger than the upper limit torque Tinmax, and the upper limit torque Tinmax is increased by the predetermined value α at a time (by rate processing) when the temporary torque Tintmp of the input shaft 61 is larger than the upper limit torque Tinmax. Alternatively, the upper limit torque Tinmax may be increased by the predetermined value α at a time regardless of the relation between the magnitudes of the temporary torque Tintmp and the upper limit torque Tinmax.

In the hybrid automobile 20 of the embodiment, in the case where the value of the feeling flag Fs is 1 before the value of the upper limit torque Tinmax of the input shaft 61 of the transmission 60 is returned from 0 to the upper limit rated value Tinmaxrt, the upper limit torque Tinmax is increased by the predetermined value α at a time (by rate processing) within a range from the torque Tin1 to the torque Tin2. Alternatively, the value of the upper limit torque Tinmax may be increased by the predetermined value α at a time within a range from 0 to the torque Tin2 or the upper limit rated value Tinmaxrt. Or the value of the upper limit torque Tinmax may be increased by the predetermined value α at a time within a range from the torque Tin1 to the upper limit rated value Tinmaxrt.

In the hybrid automobile 20 of the embodiment, in the case where the value of the feeling flag Fs is 0 before the value of the upper limit torque Tinmax of the input shaft 61 of the transmission 60 is returned from 0 to the upper limit rated value Tinmaxrt, the upper limit torque Tinmax is immediately returned to the upper limit rated value Tinmaxrt, whereas in the case where the value of the feeling flag Fs is 1, the upper limit torque Tinmax is returned to the upper limit rated value Tinmaxrt by increasing the upper limit torque Tinmax by the predetermined value α at a time (by rate processing). However, as long as the upper limit torque Tinmax is more gradually returned to the upper limit rated value Tinmaxrt when the value of the feeling flag Fs is 1 than when the value of the feeling flag is 0, the upper limit torque Tinmax may be returned to the upper limit rated value Tinmaxrt by increasing the upper limit torque Tinmax by a predetermined value α2, larger than the predetermined value α, at a time (by rate processing) when the value of the feeling flag Fs is 0.

In the hybrid automobile 20 of the embodiment, the fail-safe gear Gsfs is fail-safe first gear when the vehicle speed V is not higher than the threshold value ref, and the fail-safe gear Gsfs is fail-safe third gear when the vehicle speed V is higher than the threshold value Vref. However, the fail-safe gear Gsfs may also be third gear regardless of the vehicle speed V.

Described above are the actions in the hybrid automobile 20 of the embodiment in the case where abnormality has occurred in the transmission 60 (hydraulic control device 90) and an unintended rise or decrease in the rotation speed Nin of the input shaft 61 is detected, and transition to the fail-safe gear Gsfs is completed after the values of the upper limit torque Tinmax and the lower limit torque Tinmin of the input shaft 61 are restricted to 0, and then the upper limit torque Tinmax and the lower limit torque Tinmin are returned to the upper limit rated value Tinmaxrt and the lower limit rated value Tinminrt. However, the same concept also applies to a case where, for other reason, the values of the upper limit torque Tinmax and the lower limit torque Tinmin are restricted to 0 and then the upper limit torque Tinmax and the lower limit torque Tinmin are returned to the upper limit rated value Tinmaxrt and the lower limit rated value Tinminrt.

In the hybrid automobile 20 of the embodiment, the value of the upper limit torque Tinmax of the input shaft 61 is restricted to 0 as a value smaller than the upper limit rated value Tinmaxrt, but the value of the upper limit torque Tinmax may instead be restricted to a positive value slightly larger than 0. In the hybrid automobile 20 of the embodiment, the value of the input torque Tinmin is restricted to 0 as a value larger (having an absolute value smaller) than the upper limit rated value Tinmaxrt, but the value of the input torque Tinmin may instead be restricted to a negative value slightly smaller than 0.

In the hybrid automobile 20 of the embodiment, a four-speed transmission is used as the transmission 60. However, a two-speed transmission, three-speed transmission, five-speed transmission, six-speed transmission, eight-speed transmission, or ten-speed transmission may instead be used as the transmission.

In the hybrid automobile 20 of the embodiment, the battery 50 is used as the electric storage device. However, a capacitor may be used in place of the battery 50, or the battery 50 and a capacitor may be used in combination.

The hybrid automobile 20 of the embodiment is equipped with the engine ECU 24, the motor ECU 40, the battery ECU 52, and the HVECU 70. However, at least two of these ECUs may be configured as a single electronic control unit.

Figure 14:
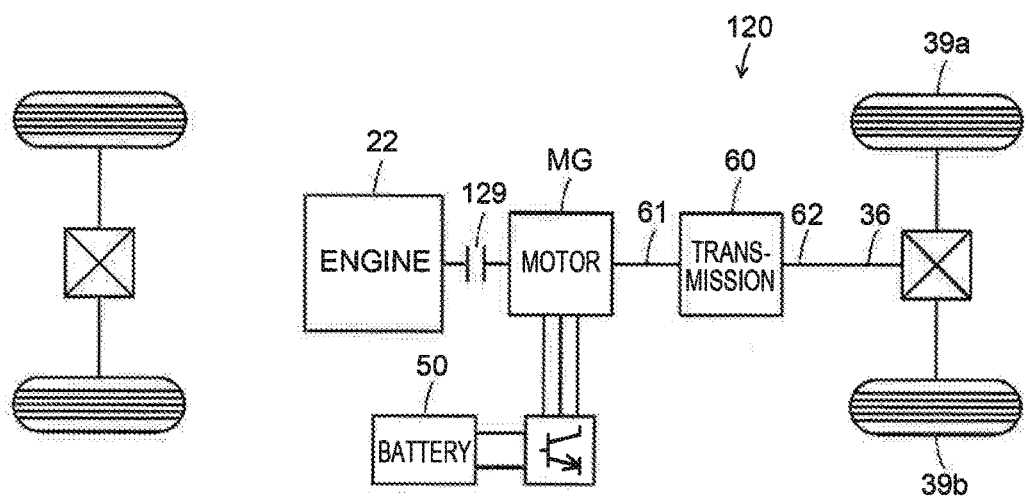
FIG. 14 is a configuration diagram showing an overview of the configuration of a hybrid automobile 120 in a modified example.
Figure 15:
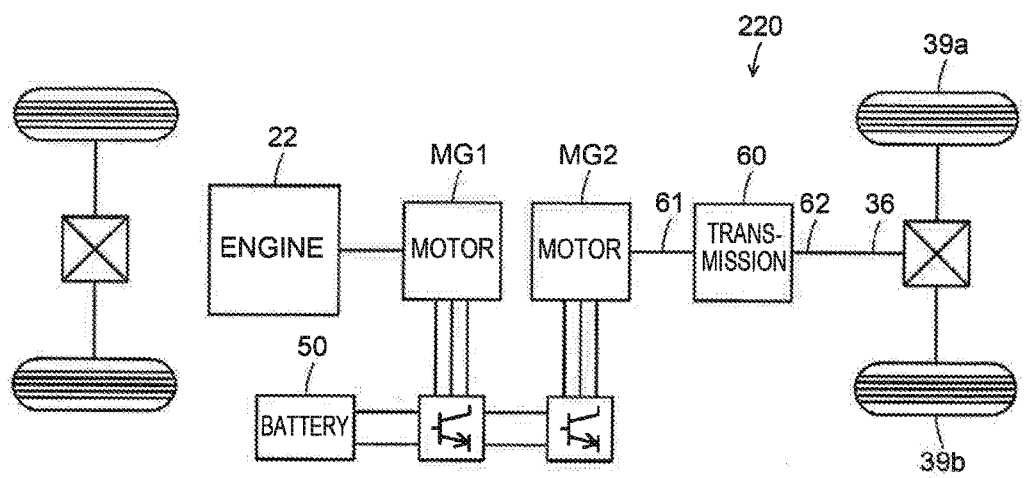
FIG. 15 is a configuration diagram showing an overview of the configuration of a hybrid automobile 220 in another modified example.
Figure 16:
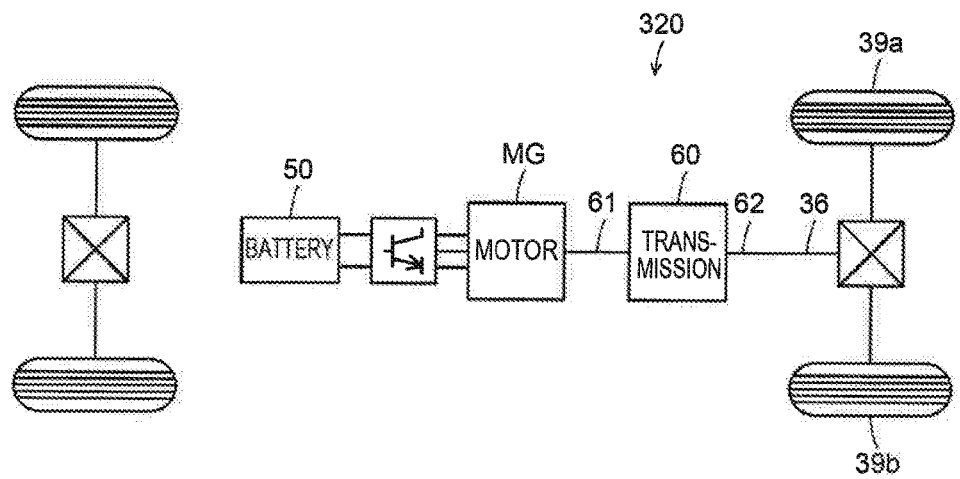
FIG. 16 is a configuration diagram showing an overview of the configuration of an electric automobile 320 in yet another modified example.

In the embodiment, the hybrid automobile 20 has the configuration in which the output shaft 62 of the transmission 60 is connected to the driving shaft 36 that is coupled to the driving wheels 39a, 39b, and the motor MG2 is connected to the input shaft 61 of the transmission 60, and the engine 22 and the motor MG I are connected to the input shaft 61 through the planetary gear 30. However, as in a modified example shown in FIG. 14, the configuration of a hybrid automobile 120 may be adopted in which the motor MG is connected to the input shaft 61 of the transmission 60 and the engine 22 is connected to the motor MG through a clutch 129. As in another modified example shown in FIG. 15, the so-called series configuration of a hybrid automobile 220 may be adopted in which the travel motor MG2 is connected to the input shaft 61 of the transmission 60 and the power-generating motor MG1 is connected to the engine 22, and in which electric power is transmitted between the motors MG1, MG2 and the battery 50. As in yet another modified example shown in FIG. 16, the configuration of an electric automobile 320 may be adopted in which the travel motor MG is connected to the input shaft 61 of the transmission 60.

Correspondence between the main elements of the embodiment and the main elements of the present disclosure described in Summary will be described. In the embodiment, the motor MG2 corresponds to the "motor," the transmission 60 corresponds to the "transmission," and the HVECU 70 and the motor ECU 40 correspond to the "electronic control unit."

As the embodiment is an example for specifically describing a form of implementation of the disclosure described in the Summary, the correspondence between the main elements of the embodiment and the main elements of the disclosure described in Summary is not intended to limit the elements of the disclosure described in Summary. Thus, the disclosure described in Summary should be interpreted on the basis of the description of that section, while the embodiment is a mere example of the disclosure described in Summary.

While the form of implementation of the present disclosure has been described above using the embodiment, it should be understood that the present disclosure is not in any way limited to this embodiment but can be implemented in various forms within the scope of the gist of the disclosure.

The present disclosure is applicable to automobile manufacturing industries, etc.

What is claimed is:
1. An automobile, comprising:
   a motor;

a transmission including an input shaft connected to the motor and an output shaft coupled to driving wheels, the transmission being configured to transmit power, and the transmission being configured to change shift gears between the input shaft and the output shaft; and an electronic control unit being configured to control the motor and the transmission, the electronic control unit being configured to control the motor such that a torque applied to the input shaft does not exceed an upper limit torque, the electronic control unit being configured to set so as to restrict the upper limit torque from a first torque to a second torque smaller than the first torque, and the electronic control unit being configured to set so as to return the upper limit torque from the second torque to the first torque at a relatively slower rate of increase of the upper limit torque when a first condition is met before the upper limit torque is returned to the first torque as compared to a relatively higher rate of increase of the upper limit torque when the first condition is not met before the upper limit torque is returned to the first torque, the first condition being a condition that a driver is assumed to have felt a decrease in driving force output to the driving wheels.

2. The automobile according to claim 1, further comprising a hydraulic control device that supplies hydraulic pressure to a plurality of engaging elements of the transmission, wherein, the electronic control unit is configured to control the transmission so as to shift into a fail-safe shift gear when an abnormality has occurred in the hydraulic control device, and the electronic control unit is configured to restrict the upper limit torque to the second torque when the electronic control unit controls the transmission so as to shift into the fail-safe shift gear.

3. The automobile according to claim 2, wherein the electronic control unit is configured to return the upper limit torque to the first torque when the transmission has shifted into the fail-safe shift gear while the upper limit torque is the second torque.

4. The automobile according to claim 1, wherein the first condition is a condition that the automobile has an experience where a brake is released while the upper limit torque is the second torque.

5. The automobile according to claim 1, wherein the first condition is a condition that the automobile has an experience where either a duration time or a cumulative time for which a brake is released reaches a predetermined time while the upper limit torque is the second torque.

6. The automobile according to claim 1, wherein the first condition is a condition that the automobile has an experience where an accelerator operation amount is larger than a threshold value while the upper limit torque is the second torque.

7. The automobile according to claim 1, wherein the first condition is a condition that the automobile has an experience where either a duration time or a cumulative time for which an accelerator operation amount is larger than a threshold value reaches a predetermined time while the upper limit torque is the second torque.

8. The automobile according to claim 1, wherein the electronic control unit is configured to control the motor so as to hold the upper limit torque when following conditions i) and ii) are both satisfied, i) the first condition is met before the upper limit torque is returned to the first torque, and ii) a temporary required torque for the input shaft based on an accelerator operation amount is not larger than the upper limit torque, and the electronic control unit controls the motor so as to increase the upper limit torque when following conditions i) and iii) are both satisfied, i) the first condition is met before the upper limit torque is returned to the first torque, and iii) the temporary required torque is larger than the upper limit torque.

9. The automobile according to claim 1, wherein the electronic control unit is configured to control the transmission so as to shift into a fail-safe shift gear when an abnormality has occurred in the transmission, and the electronic control unit is configured to restrict the upper limit torque to the second torque when the electronic control unit controls the transmission so as to shift into the fail-safe shift gear.

10. The automobile according to claim 1, wherein, the electronic control unit is configured to set so as to return the upper limit torque to the first torque by increasing the upper limit torque from the second torque by a predetermined torque at a time when the first condition is met before the upper limit torque is returned from the second torque to the first torque, the electronic control unit is configured to set so as to return the upper limit torque to the first torque by increasing the upper limit torque from the second torque by a torque larger than the predetermined torque at a time when the first condition is not met before the upper limit torque is returned from the second torque to the first torque.

11. A control method for an automobile, the automobile including:

a motor;

a transmission including an input shaft connected to the motor and an output shaft coupled to driving wheels, the transmission being configured to transmit power, and the transmission being configured to change shift gears between the input shaft and the output shaft; and an electronic control unit is configured to control the motor and the transmission, the electronic control unit is configured to control the motor such that a torque applied to the input shaft does not exceed an upper limit torque, the control method comprising:

setting, by the electronic control unit, so as to restrict the upper limit torque from a first torque to a second torque smaller than the first torque; and setting, by the electronic control unit, so as to return the upper limit torque from the second torque to the first torque at a relatively slower rate of increase of the upper limit torque when a first condition is met before the upper limit torque is returned to the first torque as compared to a relatively higher rate of increase of the upper limit torque when the first condition is not met before the upper limit torque is returned to the first torque, the first condition being a condition that a driver is assumed to have felt a decrease in driving force output to the driving wheels.

12. The control method for the automobile according to claim 11, wherein, setting, by the electronic control unit, so as to return the upper limit torque to the first torque by increasing the upper limit torque from the second torque by a predetermined torque at a time when the first condition is met before the upper limit torque is returned from the second torque to the first torque, setting, by the electronic control unit, so as to return the upper limit torque to the first torque by increasing the upper limit torque from the second torque by a torque larger than the predetermined torque at a time when the first condition is not met before the upper limit torque is returned from the second torque to the first torque.

* * * * *